(12) United States Patent
Ito et al.

(10) Patent No.: US 11,472,943 B2
(45) Date of Patent: Oct. 18, 2022

(54) POLYMERIZABLE COMPOSITION FOR OPTICAL MATERIAL, OPTICAL MATERIAL, AND APPLICATION THEREOF

(71) Applicant: MITSUI CHEMICALS, INC., Tokyo (JP)

(72) Inventors: Shinsuke Ito, Omuta (JP); Kouji Suesugi, Arao (JP)

(73) Assignee: MITSUI CHEMICALS, INC., Tokyo (JP)

( * ) Notice: Subject to any disclaimer, the term of this patent is extended or adjusted under 35 U.S.C. 154(b) by 0 days.

(21) Appl. No.: 16/632,605

(22) PCT Filed: Jul. 25, 2018

(86) PCT No.: PCT/JP2018/027877
§ 371 (c)(1),
(2) Date: Jan. 21, 2020

(87) PCT Pub. No.: WO2090/022131
PCT Pub. Date: Jan. 31, 2019

(65) Prior Publication Data
US 2020/0207947 A1    Jul. 2, 2020

(30) Foreign Application Priority Data

Jul. 26, 2017 (JP) .............................. JP2017-144355

(51) Int. Cl.
| | | |
|---|---|---|
| C08K 5/18 | (2006.01) | |
| C08G 18/38 | (2006.01) | |
| C08G 18/72 | (2006.01) | |
| G02B 1/04 | (2006.01) | |

(52) U.S. Cl.
CPC ................ *C08K 5/18* (2013.01); *C08G 18/38* (2013.01); *C08G 18/722* (2013.01); *G02B 1/041* (2013.01)

(58) Field of Classification Search
CPC ....................................................... G02B 1/04
See application file for complete search history.

(56) References Cited

U.S. PATENT DOCUMENTS

| | | | |
|---|---|---|---|
| 3,390,051 A | 6/1968 | Albert et al. | |
| 4,284,621 A | 8/1981 | Preuss et al. | |
| 4,367,280 A * | 1/1983 | Kondo ...................... | C08F 2/50 430/281.1 |
| 5,874,180 A | 2/1999 | Wehrmann et al. | |
| 6,017,660 A * | 1/2000 | Palazzotto ................ | C08F 2/50 430/17 |
| 7,887,882 B2 | 2/2011 | Nunez et al. | |
| 9,933,635 B2 | 4/2018 | Hashimoto et al. | |
| 10,066,081 B2 | 9/2018 | Kakinuma et al. | |
| 2004/0126700 A1 | 7/2004 | Lee et al. | |
| 2006/0175579 A1 | 8/2006 | Nunez et al. | |
| 2015/0370094 A1 | 12/2015 | Hashimoto et al. | |
| 2016/0017218 A1 | 1/2016 | Kojima et al. | |
| 2016/0215121 A1 | 7/2016 | Kousaka et al. | |
| 2016/0304701 A1 | 10/2016 | Kakinuma et al. | |
| 2016/0313575 A1 | 10/2016 | Kakinuma et al. | |
| 2018/0016415 A1 | 1/2018 | Kakinuma et al. | |
| 2018/0362730 A1 | 12/2018 | Kousaka et al. | |
| 2018/0362731 A1 | 12/2018 | Kousaka et al. | |
| 2019/0119467 A1 | 4/2019 | Kousaka et al. | |

FOREIGN PATENT DOCUMENTS

| | | |
|---|---|---|
| EP | 0 290 133 A2 | 11/1988 |
| GB | 1064116 A | 4/1967 |
| JP | S5390387 A | 8/1978 |
| JP | S63201116 A | 8/1988 |
| JP | H0873843 A | 3/1996 |
| JP | H10186291 A | 7/1998 |
| JP | 2004210763 A | 7/2004 |
| JP | 2005292240 A | 10/2005 |
| JP | 2008530288 A | 8/2008 |
| WO | 2014133111 A1 | 9/2014 |
| WO | 2015046540 A1 | 4/2015 |
| WO | 2016125736 A1 | 8/2016 |

OTHER PUBLICATIONS

International Search Report (PCT/ISA/210) and an English translation thereof, and Written Opinion (PCT/ISA/237) dated Oct. 30, 2018, by the Japanese Patent Office as the International Searching Authority for International Application No. PCT/JP2018/027877.
Knels, et al., "Blue light stress in retinal neuronal (R28) cells is dependent on wavelength range and irradiance", The European journal of neuroscience, 2011, vol. 34, Iss.4, pp. 548-558.

* cited by examiner

*Primary Examiner* — Michael F Pepitone
(74) *Attorney, Agent, or Firm* — Buchanan Ingersoll & Rooney PC

(57) ABSTRACT

A polymerizable composition for an optical material includes a compound represented by General Formula (1) and a polymerization reactive compound.

(1)

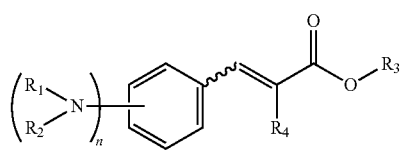

8 Claims, No Drawings

POLYMERIZABLE COMPOSITION FOR OPTICAL MATERIAL, OPTICAL MATERIAL, AND APPLICATION THEREOF

CROSS-REFERENCE TO RELATED APPLICATIONS

This application is a U.S. national stage application of PCT/JP2018/027877, filed Jul. 25, 2018, which claims priority to Japanese Patent Application No. 2017-144355, filed Jul. 26, 2017, the entire contents of all of which are hereby incorporated by reference.

TECHNICAL FIELD

The present invention relates to a polymerizable composition for an optical material, an optical material obtained from the composition, and an application thereof.

BACKGROUND ART

In the related art, the adverse effects of exposure of the eyes to ultraviolet light have been regarded as a problem. Furthermore, in recent years, there has been a problem in that blue light included in natural light, light emitted from liquid crystal displays of office equipment and displays of portable equipment such as smartphones and mobile phones, and the like affects the eyes, causing eye fatigue, pain, and the like and it is desirable to reduce the amount of exposure of the eyes to from ultraviolet light to relatively short wavelength blue light of approximately 420 nm. Spectacle lenses which cut light with a wavelength in the vicinity of 420 nm are commercially available from various companies.

The influence of short wavelength blue light of approximately 420 nm on the eyes is described in Non-Patent Document 1. In Non-Patent Document 1, retinal nerve cells (cultured retinal nerve R28 cells from rats) were irradiated with blue LED light having different peak wavelengths of 411 nm and 470 nm and damage to the retinal nerve cells was verified. As a result, it was shown that, when irradiated (4.5 w/m$^2$) with blue light having a peak wavelength at 411 nm, cell death of the retinal nerve cells occurred within 24 hours, while blue light having a peak wavelength at 470 nm did not cause changes in the cells even with the same amount of irradiation, thereby showing that suppressing exposure to light with a wavelength of 400 to 420 nm is important to prevent eye damage.

In addition, there is a concern that irradiation of blue light to the eyes for a long time causes eye fatigue and stress and may be considered a factor which causes age-related macular degeneration.

Examples of techniques aimed at suppressing the transmission of blue light are as follows.

Patent Document 1 discloses a plastic lens including an ultraviolet absorber having an average light transmittance of 0.5% or less in a wavelength region of 300 nm or more and 400 nm or less.

Patent Document 2 discloses a plastic spectacle lens using a specific benzotriazole compound. This document describes that this plastic spectacle lens has a light transmittance at a wavelength of 395 nm, a wavelength of 400 nm, and a wavelength of 405 nm in a predetermined range.

Patent Document 3 discloses a transparent plastic material including an ultraviolet absorber formed of a specific benzotriazole compound and having a high light cutting rate in the blue region (380 to 500 nm) and a high light cutting rate at 410 nm.

Patent Document 4 discloses an optical material which has a strong effect of suppressing the transmission of from harmful ultraviolet light to blue light of approximately 420 nm, which is colorless and transparent, which has an excellent appearance, and which has good optical characteristics such as a high refractive index and a high Abbe number. It is disclosed that, since it is also possible to reduce the effects of harmful light on the eyes and suppress damage such as eye strain and stress, the above material is particularly suitable for use as a plastic spectacle lens.

Patent Document 5 discloses a polymerizable composition for an optical material for which the productivity of an optical material using a specific ultraviolet absorber is excellent. It is disclosed that an optical material obtained from this composition has a strong effect of suppressing the transmission of from harmful ultraviolet light to blue light of approximately 420 nm and is to be used as a plastic spectacle lens.

Patent Document 6 discloses an ultraviolet absorber containing a specific cinnamic acid derivative and salts thereof. It is disclosed that the ultraviolet absorber absorbs ultraviolet light in the long wavelength region (approximately 400 to 320 nm) of ultraviolet light and has applications for cosmetics in particular. There is no description in relation to the effect of suppressing the transmission of blue light of approximately 420 nm. In addition, it is not disclosed that it is possible to use the compound by addition to a plastic spectacle lens.

Patent Document 7 discloses that it is possible to use a composition including an ultraviolet absorber represented by a specific formula as a cosmetic. The document does not describe the relationship between this ultraviolet absorber and the effect of suppressing the transmission of blue light of approximately 420 nm. In addition, it is not disclosed that it is possible to use this composition as a polymerizable composition for plastic spectacle lenses.

Patent Document 8 discloses a water-soluble composition including an ultraviolet absorber and an effective amount of an antioxidant. In this document, cinnamic acid derivatives are given as examples of ultraviolet absorbers. It is also disclosed that the composition is useful for the manufacturing of ophthalmic devices such as spectacle lenses, contact lenses, and intraocular lenses. The document does not describe the relationship between this ultraviolet absorber and the effect of suppressing the transmission of blue light of approximately 420 nm.

RELATED DOCUMENTS

Patent Documents

[Patent Document 1] JPH10-186291
[Patent Document 2] JP2005-292240
[Patent Document 3] WO2015/046540
[Patent Document 4] WO2014/133111
[Patent Document 5] WO2016/125736
[Patent Document 6] JPS63-201116
[Patent Document 7] U.S. Pat. No. 4,284,621
[Patent Document 8] JP2008-530288

Non-Patent Documents

[Non-Patent Document 1] The European journal of neuroscience, Vol. 34, Iss. 4, 548-558, 2011

SUMMARY OF THE INVENTION

Technical Problem

In the related art, ultraviolet absorbers such as benzotriazole, benzophenone, triazine, salicylate, and dibenzoylmethane are widely used in order to reduce the amount of exposure of the eyes to from ultraviolet light type to blue light having a comparatively short wavelength of approximately 420 nm. However, in spectacle lenses including an ultraviolet absorber in the related art, in particular, there is a problem in that it is only possible to suppress the transmission of light in the vicinity of 420 nm to approximately 80% and approximately 20% passes through the spectacle lens and reaches the eye, such that there is room for improvement.

Solution to Problem

As a result of intensive research to solve the problems described above, the present inventors found that an optical material including a compound having a specific structure has a performance of effectively suppressing the transmission of light in the vicinity of 420 nm, thereby completing the present invention.

That is, it is possible to show the present invention as follows.

[1] A polymerizable composition for an optical material including a compound represented by General Formula (1); and a polymerization reactive compound,

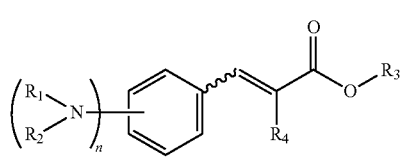

(1)

in which General Formula (1), $R_1$ and $R_2$ each independently represent a hydrogen atom or a linear or branched alkyl group having 1 to 10 carbon atoms, $R_3$ represents a hydrogen atom or a linear or branched alkyl group having 1 to 20 carbon atoms, $R_4$ represents a hydrogen atom, a linear or branched alkyl group having 1 to 10 carbon atoms, or —C(O)OR$_5$. $R_5$ represents a hydrogen atom or a linear or branched alkyl group having 1 to 20 carbon atoms. n represents an integer of 1 to 5.

[2] The polymerizable composition for an optical material according to 1, in which the compound represented by General Formula (1) is a compound represented by Formula (2).

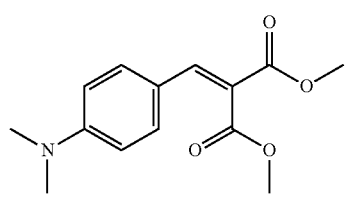

(2)

[3] The polymerizable composition for an optical material according to [1], in which the compound represented by General Formula (1) is a compound represented by Formula (3).

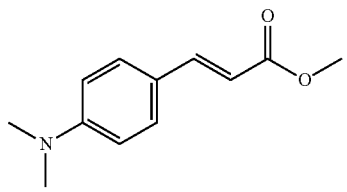

(3)

[4] The polymerizable composition for an optical material according to any one of [1] to [3], in which the polymerization reactive compound is a compound of one or more types selected from a polyiso(thio)cyanate compound, a poly(thio)epoxy compound, a polyoxetanyl compound, a polythietanyl compound, a poly(meth)acryloyl compound, a polyalkene compound, an alkyne compound, a poly(thi)ol compound, a polyamine compound, acid anhydrides, and a polycarboxylic acid compound.

[5] A molded product obtained by curing the polymerizable composition for an optical material according to any one of [1] to [4].

[6] An optical material including a compound represented by General Formula (1),

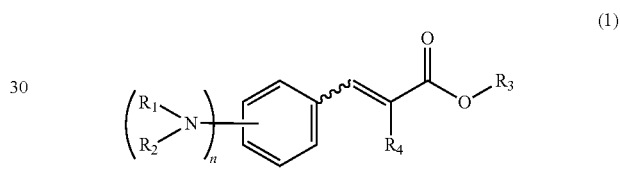

(1)

in which General Formula (1), $R_1$ and $R_2$ each independently represent a hydrogen atom or a linear or branched alkyl group having 1 to 10 carbon atoms, $R_3$ represents a hydrogen atom or a linear or branched alkyl group having 1 to 20 carbon atoms, $R_4$ represents a hydrogen atom, a linear or branched alkyl group having 1 to 10 carbon atoms, or —C(O)OR$_5$. $R_5$ represents a hydrogen atom or a linear or branched alkyl group having 1 to 20 carbon atoms. n represents an integer of 1 to 5.

[7] The optical material according to [6], in which the optical material is comprised of a resin base material.

[8] The optical material according to [6], in which the optical material is a laminate of a resin base material and a layer, and wherein at least one of the resin base material and the layer includes the compound represented by General Formula (1).

[9] The optical material according to [7] or [8], in which the resin base material is the molded product according to [5].

[10] A plastic lens comprised of the optical material according to any one of [6] to [9].

[11] A process for producing an optical material, including: cast polymerizing the polymerizable composition for an optical material according to any one of [1] to [4].

Advantageous Effects of Invention

According to the present invention, using a specific compound makes it possible to provide an optical material having an extremely strong effect of suppressing the transmission of blue light of approximately 420 nm. In addition, it is possible to express this suppression effect by adding a smaller amount than the added amount of the ultraviolet absorber used in the field of optical materials in the related art and to suppress the transmission of visible light up to any wavelength depending on the blended amount.

DESCRIPTION OF EMBODIMENTS

The optical material of the present invention includes a compound represented by General Formula (1).

A description will be given below of the optical material of the present invention based on a first embodiment or a second embodiment. In addition, description of the same configurations and components will not be repeated.

First Embodiment

The optical material of the first embodiment is comprised of a resin base material including a compound represented by General Formula (1).

A description will be given below of each component.

[Compound Represented by General Formula (1)]

In the present embodiment, the resin base material includes a compound represented by General Formula (1) (referred to below as a compound (1)).

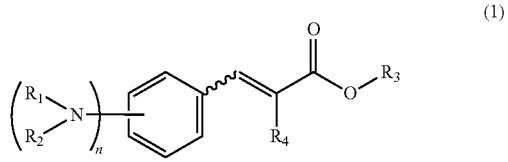

In General Formula (1), $R_1$ and $R_2$ each independently represent a hydrogen atom or a linear or branched alkyl group having 1 to 10 carbon atoms, $R_3$ represents a hydrogen atom or a linear or branched alkyl group having 1 to 20 carbon atoms, $R_4$ represents a hydrogen atom, a linear or branched alkyl group having 1 to 10 carbon atoms, or —C(O)OR$_5$. $R_5$ represents a hydrogen atom or a linear or branched alkyl group having 1 to 20 carbon atoms. n represents an integer of 1 to 5.

It is possible to obtain the compound represented by General Formula (1) as either a cis type or a trans type and the compound may be a mixture including the above at an arbitrary ratio.

Examples of the compound represented by General Formula (1) include compounds represented by Formula (2), 4-dimethylaminobenzylidene malonic acid, 4-dimethylaminobenzylidene malonic acid monomethyl, 4-dimethylaminobenzylidene malonic acid monoethyl, 4-dimethylaminobenzylidene malonic acid diethyl, compounds represented by Formula (3), 4-dimethylaminocinnamic acid, 4-dimethylaminocinnamic acid ethyl, 4-dimethylaminocinnamic acid-n-propyl, 4-dimethylaminocinnamic acid isopropyl, 4-dimethylaminocinnamic acid-n-butyl, 4-dimethylaminocinnamic acid isobutyl, 4-dimethylaminocinnamic acid isoamyl, 4-dimethylaminocinnamic acid-2-ethylhexyl, 4-dimethylaminocinnamic acid lauryl, 4-diethylaminocinnamic acid, 4-diethylaminocinnamic acid methyl, 4-diethylaminocinnamic acid ethyl, and the like and it is possible to use the above as one type or in a combination of two or more types. From the viewpoint of more effectively suppressing the transmission of light in the vicinity of 420 nm, it is more preferable to use the compound represented by Formula (2) or Formula (3) alone or in a combination.

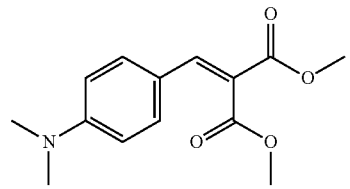

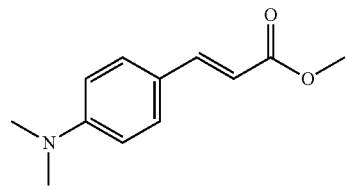

In the present embodiment, the added amount of the compound (1) with respect to 100 parts by weight of the resin forming the resin base material is in a range of 0.0001% by weight to 10% by weight, preferably 0.001% by weight to 1% by weight, even more preferably 0.005% by weight to 0.5% by weight, and particularly preferably 0.01% by weight to 0.1% by weight.

It is possible for the compound (1) to exhibit the effect of suppressing the transmission of light in the vicinity of 420 nm, even with a smaller amount than the added amount of the ultraviolet absorber used in the field of optical materials in the related art. Therefore, in the optical material, it is possible to suppress problems such as generation of white turbidity caused by additives and deteriorating in the heat resistance and Abbe number and also to reduce the manufacturing cost.

In a case where a polymerizable composition including a polyisocyanate compound and a polythiol compound as a polymerization reactive compound is heated and cured to produce a thiourethane resin, from the point of view of the effect described above, the added amount of the compound (1) in the polymerizable composition is in the range of 0.0001% by weight to 10% by weight, preferably 0.001% by weight to 1% by weight, more preferably 0.005% by weight to 0.5% by weight, and particularly preferably 0.01% by weight to 0.1% by weight.

[Resin Base Material]

As the resin forming the resin base material, it is possible to use at least one type selected from poly(thio)urethane, polysulfide, polycarbonate, poly(meth)acrylate, polyolefin, cyclic polyolefin, polyallyl, polyurethaneurea, a polyene-polythiol polymer, a ring-opening metathesis polymer, polyester, and epoxy resins, and it is possible to preferably use at least one type selected from poly(thio)urethane, polysulfide, polycarbonate, poly(meth)acrylate, and polyolefin.

These materials are highly transparent materials and are able to be suitably used as a resin base material for optical materials. Here, these materials may be individual materials or may be composite materials of the above.

It is possible to obtain the resin base material in the present embodiment by curing and molding a resin composition or a polymerizable composition including a polymerization reactive compound by a predetermined process.

The resin included in the resin composition is preferably polycarbonate, polyamide, triacetyl cellulose, or polyester.

A description will be given below of a polymerizable composition and a process for producing an optical material (resin base material) using the composition.

<Polymerizable Composition for Optical Material>

The polymerizable composition for an optical material of the present embodiment includes a compound (1) and a polymerization reactive compound. A description will be given below of the polymerization reactive compound.

[Polymerization Reactive Compound]

The polymerization reactive compound includes polymerization reactive compounds having at least one polymerizable functional group capable of self-polymerization, copolymerization, or addition polymerization in the presence or absence of additives such as an initiator and a catalyst added as necessary.

A more detailed description will be given of the compound having a polymerizable functional group capable of self-polymerization, copolymerization, or addition polymerization and examples thereof include a polyiso (thio) cyanate compound having two or more isocyanato groups or isothiocyanato groups, a poly(thio) epoxy compound having two or more epoxy groups or thioepoxy groups, a polyoxetanyl compound having two or more oxetanyl groups, a polythietanyl compound having two or more thietanyl groups or having an oxetanyl group and a thietanyl group, a poly(meth)acryloyl compound having two or more methacryloyloxy groups, acryloyloxy groups, methacryloylthio groups, acryloylthio groups, methacrylamide groups, or acrylamide groups, a polyalkene compound having two or more polymerizable carbon-carbon double bond groups other than methacryloyloxy groups, acryloyloxy groups, methacryloylthio groups, acryloylthio groups, methacrylamide groups, or acrylamide groups, an alkyne compound having one or more polymerizable carbon-carbon triple bond groups, a poly(thi)ol compound having two or more hydroxy groups or mercapto groups (but not including alcohol used as a solvent), a polyamine compound having two or more amino groups or secondary amino groups, an acid anhydride having one or more acid anhydride groups, a polycarboxylic acid compound having two or more carboxyl groups, and the like and it is possible to use at least one type thereof.

Here, the compound (1) is excluded from the polymerization reactive compounds described above.

Examples of polyiso(thio)cyanate compounds include aliphatic polyisocyanate compounds such as tetramethylene diisocyanate, pentamethylene diisocyanate, hexamethylene diisocyanate, pentamethylene diisocyanate, octamethylene diisocyanate, 2,2,4-trimethylhexamethylene diisocyanate, 2,4,4-trimethylhexamethylene diisocyanate, lysine diisocyanatomethyl ester, lysine triisocyanate, and xylylene diisocyanate; alicyclic polyisocyanate compounds such as isophorone diisocyanate, bis(isocyanatomethyl)cyclohexane, bis(isocyanatocyclohexyl)methane, dicyclohexyldimethylmethane isocyanate, 2,5-bis(isocyanatomethyl)bicyclo-[2.2.1]-heptane, 2,6-bis(isocyanatomethyl)bicyclo-[2.2.1]-heptane, 3,8-bis(isocyanatomethyl)tricyclodecane, 3,9-bis(isocyanatomethyl)tricyclodecane, 4,8-bis(isocyanatomethyl)tricyclodecane, and 4,9-bis(isocyanatomethyl)tricyclodecane; aromatic polyisocyanate compounds such as tolylene diisocyanate, 4,4'-diphenylmethane diisocyanate, diphenyl sulfide-4,4-diisocyanate, and phenylene diisocyanate; heterocyclic polyisocyanate compounds such as 2,5-diisocyanatothiophene, 2,5-bis(isocyanatomethyl)thiophene, 2,5-diisocyanatotetrahydrothiophene, 2,5-bis(isocyanatomethyl)tetrahydrothiophene, 3,4-bis(isocyanatomethyl)tetrahydrothiophene, 2,5-diisocyanato-1,4-dithiane, 2,5-bis(isocyanatomethyl)-1,4-dithiane, 4,5-diisocyanato-1,3-dithiolane, and 4,5-bis(isocyanatomethyl)-1,3-dithiolane; aliphatic polyisothiocyanate compounds such as hexamethylene diisothiocyanate, lysine diisothiocyanate methyl ester, lysine triisothiocyanate, m-xylylene diisothiocyanate, bis(isothiocyanatomethyl)sulfide, bis(isothiocyanatoethyl)sulfide, and bis(isothiocyanatoethyl)disulfide; alicyclic polyisothiocyanate compounds such as isophorone diisothiocyanate, bis(isothiocyanatomethyl)cyclohexane, bis(isothiocyanatocyclohexyl)methane, cyclohexanediisothiocyanate, methylcyclohexanediisothiocyanate, 2,5-bis(isothiocyanatomethyl)bicyclo-[2.2.1]-heptane, 2,6-bis(isothiocyanatomethyl)bicyclo-[2.2.1]-heptane, 3,8-bis(isothiocyanatomethyl)tricyclodecane, 3,9-bis(isothiocyanatomethyl)tricyclodecane, 4,8-bis(isothiocyanatomethyl)tricyclodecane, and 4,9-bis(isothiocyanatomethyl)tricyclodecane; aromatic polyisothiocyanate compounds such as tolylene diisothiocyanate, 4,4-diphenylmethane diisothiocyanate, and diphenyl disulfide-4,4-diisothiocyanate; sulfur-containing heterocyclic polyisothiocyanate compounds such as 2,5-diisothiocyanatothiophene, 2,5-bis(isothiocyanatomethyl)thiophene, 2,5-isothiocyanatotetrahydrothiophene, 2,5-bis(isothiocyanatomethyl)tetrahydrothiophene, 3,4-bis(isothiocyanatomethyl)tetrahydrothiophene, 2,5-diisothiocyanato-1,4-dithiane, 2,5-bis(isothiocyanatomethyl)-1,4-dithiane, 4,5-diisothiocyanato-1,3-dithiolane, 4,5-bis(isothiocyanatomethyl)-1,3-dithiolane, and the like.

Examples of poly(thio)epoxy compounds include polyepoxy compounds such as bisphenol A diglycidyl ether; chained aliphatic 2,3-epoxypropylthio compounds such as bis(2,3-epoxypropyl) sulfide, bis(2,3-epoxypropyl)disulfide, bis(2,3-epoxypropylthio)methane, 1,2-bis(2,3-epoxypropylthio)ethane, 1,2-bis(2,3-epoxypropylthio)propane, 1,3-bis(2,3-epoxypropylthio)propane, 1,3-bis(2,3-epoxypropylthio)-2-methylpropane, 1,4-bis(2,3-epoxypropylthio)butane, 1,4-bis(2,3-epoxypropylthio)-2-methylbutane, 1,3-bis(2,3-epoxypropylthio)butane, 1,5-bis(2,3-epoxypropylthio)pentane, 1,5-bis(2,3-epoxypropylthio)-2-methylpentane, 1,5-bis(2,3-epoxypropylthio)-3-thiapentane, 1,6-bis(2,3-epoxypropylthio)hexane, 1,6-bis(2,3-epoxypropylthio)-2-methylhexane, 3,8-bis(2,3-epoxypropylthio)-3,6-dithiaoctane, 1,2,3-tris(2,3-epoxypropylthio) propane, 2,2-bis(2,3-epoxypropylthio)-1,3-bis(2,3-epoxypropylthiomethyl)propane, 2,2-bis(2,3-epoxypropylthiomethyl)-1-(2,3-epoxypropylthio)butane, 1,5-bis(2,3-epoxypropylthio)-2-(2,3-epoxypropylthiomethyl)-3-thiapentane, 1,5-bis(2,3-epoxypropylthio)-2,4-bis(2,3-epoxypropylthiomethyl)-3-thiapentane, 1-(2,3-epoxypropylthio)-2,2-bis(2,3-epoxypropylthiomethyl)-4-thiahexane, 1,5,6-tris(2,3-epoxypropylthio)-4-(2,3-epoxypropylthiomethyl)-3-thiahexane, 1,8-bis(2,3-epoxypropylthio)-4-(2,3-epoxypropylthiomethyl)-3,6-dithiaoctane, 1,8-bis(2,3-epoxypropylthio)-4,5-bis(2,3-epoxypropylthiomethyl)-3,6-dithiaoctane, 1,8-bis(2,3-epoxypropylthio)-4,4-bis(2,3-epoxypropylthiomethyl)-3,6-dithiaoctane, 1,8-bis(2,3-epoxypropylthio)-2,5-bis(2,3-epoxypropylthiomethyl)-3,6-dithiaoctane, 1,8-bis(2,3-epoxypropylthio)-2,4,5-tris(2,3-epoxypropylthiomethyl)-3,6-dithiaoctane, 1,1,1-tris[[2-(2,3-epoxypropylthio)ethyl]thiomethyl]-2-(2,3-epoxypropylthio)ethane, 1,1,2,2-tetrakis[[2-(2,3-epoxypropylthio)ethyl]thiomethyl]ethane, 1,11-bis(2,3-epoxypropylthio)-4,8-bis(2,3-epoxypropylthiomethyl)-3,6,9-trithiaundecane, 1,11-bis(2,3-epoxypropylthio)-4,7-bis(2,3-epoxypropylthiomethyl)-3,6,9-trithiaundecane, 1,11-bis(2,3-epoxypropylthio)-5,7-bis(2,3-epoxypropylthiomethyl)-3,6,9-trithiaundecane; cyclic aliphatic 2,3-epoxypropylthio compounds such as 1,3-bis(2,3-epoxypropylthio)

cyclohexane, 1,4-bis(2,3-epoxypropylthio)cyclohexane, 1,3-bis(2,3-epoxypropylthiomethyl)cyclohexane, 1,4-bis(2,3-epoxypropylthiomethyl)cyclohexane, 2,5-bis(2,3-epoxypropylthiomethyl)-1,4-dithiane, 2,5-bis[[2-(2,3-epoxypropylthio)ethyl]thiomethyl]-1,4-dithiane, 2,5-bis(2,3-epoxypropylthiomethyl)-2,5-dimethyl-1,4-dithiane;

aromatic 2,3-epoxypropylthio compounds such as 1,2-bis(2,3-epoxypropylthio)benzene, 1,3-bis(2,3-epoxypropylthio)benzene, 1,4-bis(2,3-epoxypropylthio)benzene, 1,2-bis(2,3-epoxypropylthiomethyl)benzene, 1,3-bis(2,3-epoxypropylthiomethyl)benzene, 1,4-bis(2,3-epoxypropylthiomethyl)benzene, bis[4-(2,3-epoxypropylthio)phenyl]methane, 2,2-bis[4-(2,3-epoxypropylthio)phenyl]propane, bis[4-(2,3-epoxypropylthio)phenyl]sulfide, bis[4-(2,3-epoxypropylthio)phenyl]sulfone, 4,4'-bis(2,3-epoxypropylthio)biphenyl, and the like.

Examples of the polyoxetanyl compound include 3-ethyl-3-hydroxymethyloxetane, 1,4-bis{[(3-ethyl-3-oxetanyl)methoxy]methyl}benzene, 3-ethyl-3-(phenoxymethyl)oxetane, di[1-ethyl-(3-oxetanyl)]methyl ether, 3-ethyl-3-(2-ethylhexyloxymethyl)oxetane, phenol novolac oxetane, and the like.

Examples of the polythietanyl compound include 1-{4-(6-mercaptomethylthio)-1,3-dithianylthio}-3-{2-(1,3-dithietanyl)}methyl-7,9-bis(mercaptomethylthio)-2,4,6,10-tetrathiaundecane, 1,5-bis{4-(6-mercaptomethylthio)-1,3-dithianylthio}-3-{2-(1,3-di thietanyl)}methyl-2,4-dithiapentane, 4,6-bis[3-{2-(1,3-dithietanyl)}methyl-5-mercapto-2,4-dithiapentylthio]-1,3-dithiane, 3-{2-(1,3-dithietanyl)}methyl-7,9-bis(mercaptomethylthio)-1,11-dimercapto-2,4,6,10-tetrathiaundecane, 9-{2-(1,3-dithietanyl)}methyl-3,5,13,15-tetrakis(mercaptomethylthio)-1,17-dimercapto-2,6,8,10,12,16-hexathiaheptadecane, 3-{2-(1,3-dithietanyl)}methyl-7,9,13,15-tetrakis(mercaptomethylthio)-1,17-dimercapto-2,4,6,10,12,16-hexathiaheptadecane, 3,7-bis{2-(1,3-dithietanyl)}methyl-1,9-dimercapto-2,4,6,8-tetrathianonane, 4,5-bis[1-{2-(1,3-dithietanyl)}-3-mercapto-2-thiapropylthio]-1,3-dithiolane, 4-[1-{2-(1,3-dithietanyl)}-3-mercapto-2-thiapropylthio]-5-{1,2-bis(mercaptomethylthio)-4-mercapto-3-thiabutylthio}-1,3-dithiolane, 4-{4-(5-mercaptomethylthio-1,3-dithiolanyl)thio}-5-[1-{2-(1,3-di thietanyl)}-3-mercapto-2-thiapropylthio]-1,3-dithiolane, and the like.

Examples of the poly(meth)acryloyl compounds include diacryloyl compounds such as ethylene glycol diacrylate, 1,3-butylene glycol diacrylate, 1,4-butanediol diacrylate, 1,6-hexanediol diacrylate, cyclohexanedimethanol diacrylate, alkoxylated hexanediol diacrylate, neopentyl glycol diacrylate, caprolactone modified neopentyl glycol hydroxypivalate diacrylate, cyclohexane dimethanol diacrylate, diethylene glycol diacrylate, dipropylene glycol diacrylate, bisphenol A diacrylate, ethoxylated bisphenol A diacrylate, hydroxy pivalaldehyde-modified trimethylolpropane diacrylate, neopentyl glycol diacrylate, polyethylene glycol diacrylate, propoxylated neopentyl glycol diacrylate, tetraethylene glycol diacrylate, tricyclodecane dimethanol diacrylate, triethylene glycol diacrylate, and tripropylene glycol diacrylate; triacryloyl compounds such as glycerol triacrylate, ethoxylated trimethylolpropane triacrylate, pentaerythritol triacrylate, propoxylated glyceryl triacrylate, propoxylated trimethylolpropane triacrylate, and tris(2-hydroxyethyl)isocyanurate triacrylate; tetraacryloyl compounds such as ditrimethylolpropane tetraacrylate, dipentaerythritol pentaacrylate, ethoxylated pentaerythritol tetraacrylate, pentaerythritol tetraacrylate, and caprolactone-modified dipentaerythritol hexaacrylate.

Examples of the polyalkene compound include polyethylene, polypropylene, polyisobutylene, diethylene glycol bis(allyl carbonate), divinylbenzene, and the like.

Examples of alkyne compounds include hydrocarbon alkynes such as 2-butyne, 2-pentyne, 2-hexyne, 3-hexyne, 2-heptin, 3-heptin, 2-octyne, 3-octyne, 4-octyne, diisopropylacetylene, 2-nonine, 3-nonine, 4-nonine, 5-nonine, 2-decyne, 3-decyne, 4-decyne, 5-decyne, di-tert-butylacetylene, diphenylacetylene, dibenzylacetylene, methyl-iso-propylacetylene, methyl-tert-butylacetylene, ethyl-iso-propylacetylene, ethyl-tert-butylacetylene, n-propyl-iso-propylacetylene, n-propyl-tert-butylacetylene, phenylmethylacetylene, phenylethylacetylene, phenyl-n-propylacetylene, phenyl-iso-propyl acetylene, phenyl-n-butyl acetylene, and phenyl-tert-butyl acetylene; alkynyl alcohols such as acetylendiol, propyneol, butyneol, pentyneol, hexyneol, hexynediol, heptineol, heptinediol, octyneol, and octynediol; alkynylamines in which some or all of the OH groups in the alkynyl alcohol described above are substituted with $NH_2$ group, and the like.

Among the poly(thi)ol compounds, examples of the polyol compound include aliphatic polyols such as ethylene glycol, diethylene glycol, propylene glycol, dipropylene glycol, tripropylene glycol, butylene glycol, neopentyl glycol, glycerin, trimethylolethane, trimethylolpropane, ditrimethylolpropane, butanetriol, 1,2-methylglucoside, pentaerythritol, dipentaerythritol, tripentaerythritol, sorbitol, erythritol, threitol, ribitol, arabinitol, xylitol, allitol, mannitol, dolcitol, iditol, glycol, inositol, hexanetriol, triglycerose, digliperol, triethylene glycol, polyethylene glycol, tris(2-hydroxyethyl)isocyanurate, cyclobutanediol, cyclopentanediol, cyclohexanediol, cycloheptanediol, cyclooctanediol, cyclohexanedimethanol, hydroxypropylcyclohexanol, tricyclo[5.2.1.0$^{2,6}$]decane-dimethanol, bicyclo[4.3.0]-nonanediol, dicyclohexanediol, tricyclo[5.3.1.1]dodecanediol, bicyclo[4.3.0]nonanedimethanol, tricyclo[5.3.1.1]dodecanediethanol, hydroxypropyltricyclo[5.3.1.1]dodecanol, spiro[3.4]octanediol, butylcyclohexanediol, 1,1'-bicyclohexylidenediol, cyclohexane triol, maltitol, and lactose; aromatic polyols such as dihydroxynaphthalene, trihydroxynaphthalene, tetrahydroxynaphthalene, dihydroxybenzene, benzenetriol, biphenyltetraol, pyrogallol, (hydroxynaphthyl)pyrogallol, trihydroxyphenanthrene, bisphenol A, bisphenol F, xylylene glycol, di(2-hydroxyethoxy)benzene, bisphenol A-bis-(2-hydroxyethyl ether), tetrabromobisphenol A, and tetrabromobisphenol A-bis-(2-hydroxyethyl ether); halogenated polyols such as dibromoneopentyl glycol; and polymer polyols such as epoxy resins. In the present embodiment, it is possible to use at least one type selected from the above in a combination.

In addition, other polyol compounds include a condensation reaction product of the above polyols and an organic acid such as oxalic acid, glutamic acid, adipic acid, acetic acid, propionic acid, cyclohexanecarboxylic acid, β-oxocyclohexanepropionic acid, dimer acid, phthalic acid, isophthalic acid, salicylic acid, 3-bromopropionic acid, 2-bromoglycol, dicarboxycyclohexane, pyromellitic acid, butanetetracarboxylic acid, and bromophthalic acid; an addition reaction product of the above polyol with an alkylene oxide such as ethylene oxide or propylene oxide; an addition reaction product of alkylene polyamines and alkylene oxides such as ethylene oxide and propylene oxide; furthermore, bis-[4-(hydroxyethoxy)phenyl]sulfide, bis-[4-(2-hydroxypropoxy)phenyl]sulfide, bis-[4-(2,3-dihydroxypropoxy)phenyl]sulfide, bis-[4-(4-hydroxycyclohexyloxy)phenyl]sulfide, bis-[2-methyl-4-(hydroxyethoxy)-6-butyl phenyl] sulfide, and compounds obtained by adding ethylene oxide and/or propylene oxide having an average of 3 molecules or less per hydroxyl group to the above compounds; polyols containing sulfur atoms such as di-(2-hydroxyethyl)sulfide, 1,2-bis-(2-hydroxyethylmercapto) ethane, bis(2-hydroxyethyl)disulfide, 1,4-dithian-2,5-diol, bis(2,3-dihydroxypropyl)sulfide, tetrakis(4-hydroxy-2-thiabutyl)methane, bis(4-hydroxyphenyl)sulfone (bisphenol S), tetrabromobisphenol S, tetramethylbisphenol S, 4,4'-thiobis(6-tert-butyl-3-methylphenol), and 1,3-bis(2-hydroxyethylthioethyl)-cyclohexane, and the like. In the present embodiment, it is possible to use at least one type selected from the above in a combination.

Examples of polythiol compounds include aliphatic polythiol compounds such as methanedithiol, 1,2-ethanedithiol, 1,2,3-propanetrithiol, 1,2-cyclohexanedithiol, bis(2-mercaptoethyl)ether, tetrakis(mercaptomethyl)methane, diethylene glycol bis(2-mercaptoacetate), diethylene glycol bis(3-mercaptopropionate), ethylene glycol bis(2-mercaptoacetate), ethylene glycol bis(3-mercaptopropionate), trimethylolpropane tris(2-mercaptoacetate), trimethylolpropane tris(3-mercaptopropionate), trimethylolethanetris(2-mercaptoacetate), trimethylolethanetris(3-mercaptopropionate), pentaerythritol tetrakis(2-mercaptoacetate), pentaerythritol tetrakis(3-mercaptopropionate), bis(mercaptomethyl)sulfide, bis(mercaptomethyl)disulfide, bis(mercaptoethyl)sulfide, bis(mercaptoethyl)disulfide, bis(mercaptopropyl)sulfide, bis(mercaptomethylthio)methane, bis(2-mercaptoethylthio)methane, bis(3-mercaptopropylthio)methane, 1,2-bis(mercaptomethylthio)ethane, 1,2-bis(2-mercaptoethylthio)ethane, 1,2-bis(3-mercaptopropylthio)ethane, 1,2,3-tris(mercaptomethylthio)propane, 1,2,3-tris(2-mercaptoethylthio)propane, 1,2,3-tris(3-mercaptopropylthio)propane, 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, tetrakis(mercaptomethylthiomethyl)methane, tetrakis(2-mercaptoethylthiomethyl)methane, tetrakis(3-mercaptopropylthiomethyl)methane, bis(2,3-dimercaptopropyl)sulfide, 2,5-dimercaptomethyl-1,4-dithiane, 2,5-dimercapto-1,4-dithiane, 2,5-dimercaptomethyl-2,5-dimethyl-1,4-dithiane, thioglycolic acid and mercaptopropionic acid esters of the above, hydroxymethyl sulfide bis(2-mercaptoacetate), hydroxymethyl sulfide bis(3-mercaptopropionate), hydroxyethyl sulfide bis(2-mercaptoacetate), hydroxyethyl sulfide bis(3-mercaptopropionate), hydroxymethyl disulfide bis(2-mercaptoacetate), hydroxymethyl disulfide bis(3-mercaptopropionate), hydroxyethyl disulfide bis(2-mercaptoacetate), hydroxyethyl disulfide bis(3-mercaptopropionate), 2-mercaptoethyl ether bis(2-mercaptoacetate), 2-mercaptoethyl ether bis(3-mercaptopropionate), thiodiglycolic acid bis(2-mercaptoethyl ester), thiodipropionic acid bis(2-mercaptoethyl ester), dithiodiglycolic acid bis(2-mercaptoethyl ester), dithiodipropionic acid bis(2-mercaptoethyl ester), 1,1,3,3-tetrakis(mercaptomethylthio)propane, 1,1,2,2-tetrakis(mercaptomethylthio)ethane, 4,6-bis(mercaptomethylthio)-1,3-dithiane, tris(mercaptomethylthio)methane, and tris(mercaptoethylthio)methane; aromatic polythiol compounds such as 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 1,2-bis(mercaptoethyl)benzene, 1,3-bis(mercaptoethyl)benzene, 1,4-bis(mercaptoethyl)benzene, 1,3,5-trimercaptobenzene, 1,3,5-tris(mercaptomethyl)benzene, 1,3,5-tris(mercaptomethyleneoxy)benzene, 1,3,5-tris(mercaptoethyleneoxy)benzene, 2,5-toluenedithiol, 3,4-toluenedithiol, 1,5-naphthalenedithiol, and 2,6-naphthalenedithiol; heterocyclic polythiol compounds such as 2-methylamino-4,6-dithiol-sym-triazine, 3,4-thiophenedithiol, bismuthiol, 4,6-bis(mercaptomethylthio)-1,3-dithiane, and 2-(2,2-bis(mercaptomethylthio)ethyl)-1,3-dithietane, and the like.

Examples of polyamine compounds include primary polyamine compounds such as ethylenediamine, 1,2- or 1,3-diaminopropane, 1,2-, 1,3-, or 1,4-diaminobutane, 1,5-diaminopentane, 1,6-diaminohexane, 1,7-diaminoheptane, 1,8-diaminooctane, 1,10-diaminodecane, 1,2-, 1,3-, or 1,4-diaminocyclohexane, o-, m- or p-diamino benzene, 3,4- or 4,4'-diaminobenzophenone, 3,4- or 4,4'-diaminodiphenyl ether, 4,4'-diaminodiphenylmethane, 4,4'-diaminodiphenyl sulfide, 3,3'- or 4,4'-diaminodiphenylsulfone, 2,7-diaminofluorene, 1,5-, 1,8-, or 2,3 diaminonaphthalene, 2,3-, 2,6-, or 3,4-diaminopyridine, 2,4-, or 2,6-diaminotoluene, m-, or p-xylylenediamine, isophoronediamine, diaminomethylbicycloheptane, 1,3- or 1,4-diaminomethylcyclohexane, 2- or 4-aminopiperidine, 2- or 4-aminomethylpiperidine, 2- or 4-aminoethylpiperidine, N-aminoethylmorpholine, and N-aminopropylmorpholine; monofunctional secondary amine compounds such as diethylamine, dipropylamine, di-n-butylamine, di-sec-butylamine, diisobutylamine, di-n-pentylamine, di-3-pentylamine, dihexylamine, dioctylamine, di(2-ethylhexyl)amine, methyl hexylamine, diallylamine, N-methylallylamine, piperidine, pyrrolidine, diphenylamine, N-methylamine, N-ethylamine, dibenzylamine, N-methylbenzylamine, N-ethylbenzylamine, dicyclohexylamine, N-methylaniline, N-ethylaniline, dinaphthylamine, 1-methylpiperazine, and morpholine; secondary polyamine compounds such as N,N'-dimethylethylenediamine, N,N'-dimethyl-1,2-diaminopropane, N,N'-dimethyl-1,3-diaminopropane, N,N'-dimethyl-1,2-diaminobutane, N,N'-dimethyl-1,3-diaminobutane, N,N'-dimethyl-1,4-diaminobutane, N,N'-dimethyl-1,5-diaminopentane, N,N'-dimethyl-1,6-diaminohexane, N,N'-dimethyl-1,7-diaminoheptane, N,N'-diethylethylenediamine, N,N'-diethyl-1,2-diaminopropane, N,N'-diethyl-1,3-diaminopropane, N,N'-diethyl-1,2-diaminobutane, N,N'-diethyl-1,3-diaminobutane, N,N'-diethyl-1,4-diaminobutane, N,N'-diethyl-1,5-diaminopentane, N,N'-diethyl-1,6-diaminohexane, N,N'-diethyl-1,7-diaminoheptane, piperazine, 2-methylpiperazine, 2,5-dimethylpiperazine, 2,6-dimethylpiperazine, homopiperazine, 1,1-di-(4-piperidyl)methane, 1,2-di-(4-piperidyl)ethane, 1,3-di-(4-piperidyl)propane, 1,4-di-(4-piperidyl)butane, and tetramethylguanidine; and the like.

Examples of acid anhydrides include succinic anhydride, phthalic anhydride, maleic anhydride, tetrabromophthalic anhydride, tetrahydrophthalic anhydride, trimellitic anhydride, dodecyl succinic anhydride, and the like.

Examples of polycarboxylic acid compounds include succinic acid, adipic acid, sebacic acid, azelaic acid, dodecanedioic acid, terephthalic acid, isophthalic acid, orthophthalic acid, phthalic anhydride, tetrahydrophthalic acid, hexahydrophthalic acid, naphthalenedicarboxylic acid, biphenyl dicarboxylic acid, dimer acid, trimellitic acid, pyromellitic acid, ε-caprolactone, and the like.

The polymerization reactive compounds described above may be used as one type or in a combination of two or more types.

From the viewpoint of improving the qualities such as the optical properties of the obtained optical lens, the polymerization reactive compound is preferably one type or two or more types of compounds selected from a polyiso(thio)cyanate compound, a poly(thio)epoxy compound, a polyoxetanyl compound, a polythietanyl compound, poly(meth)acryloyl compound, a polyalkene compound, an alkyne compound, a poly(thi)ol compound, a polyamine compound, an acid anhydride, or a polycarboxylic acid compound.

A more detailed description will be given of the polymerization reactive compound included in the composition of the present embodiment. It is possible to classify the polymerization reactive compounds described above into (Group A) and (Group B) depending on the reactivity.

(Group A): It is possible to classify polyiso(thio)cyanate compounds, poly(thio)epoxy compounds, polyoxetanyl compounds, polythietanyl compounds, poly(meth)acryloyl compounds, polyalkene compounds, or alkyne compounds into (Group A) as self-polymerizing or copolymerizing compounds. However, the following (Group B) is not included in (Group A).

(Group B): It is possible to classify poly(thi)ol compounds, polyamine compounds, acid anhydrides, or polycarboxylic acid compounds into (group B) as addition polymerizable compounds. However, the above (Group A) is not included in (Group B).

In a case where the polymerization reactive compound described above is used alone, any one type selected from (Group A) or (Group B) is selected. In a case where the polymerization reactive compound described above is used alone (one type), one type selected from the self-polymerizing or copolymerizable compounds (Group A) is preferable due to curing more easily than one type selected from the addition polymerizable compound (Group B).

In a case where two or more types of the polymerization reactive compounds described above are used, examples thereof include processes s of mixing two or more types selected from only (Group A), two or more types selected from only (Group B), or one or more types selected from (Group A) and one or more types selected from (Group B).

Polyiso(thio)cyanate compounds classified as self-polymerizable or copolymerizable compounds tend to have lower self-polymerizability or copolymerization reactivity with the (Group A) compounds compared to the other compounds classified in (Group A); however, if the conditions are selected, a self-polymerization reaction type polymer such as a 1-nylon type polymer and an isocyanurate type polymer may be obtained. Furthermore, an ethylene carbonate type copolymer may be obtained even with copolymerization with a poly(thio)epoxy compound.

In general, even if two or more types are selected from only addition polymerizability (group B), polymerization is difficult. However, in a case where an acid anhydride and a poly(thi)ol compound are combined, in a case where an acid anhydride and polyamine compound are combined, or in a case where three types of an acid anhydride, a poly(thi)ol compound, and a polyamine compound are combined, the polymerization reaction easily proceeds and a cured resin tends to be obtained. The blending ratio of the acid anhydride to the poly(thi)ol or polyamine is in a range of approximately 8/2 to 2/8, in terms of the functional group molar ratio of the acid anhydride group of the acid anhydride/the mercapto group of the poly(thi)ol (or the amino group of the polyamine), preferably in a range of 6/4 to 4/6, and more preferably in a range of 55/45 to 45/55.

When expressed in terms of the functional group molar ratio of polymerizable functional group of (Group A)/(Group B) polymerizable functional group, the blending ratio in a case of using both (Group A) and (Group B) is in a range of approximately 999/1 to 1/9, preferably 99/1 to 10/90, more preferably 9/1 to 3/7, and most preferably 7/3 to 4/6.

In the present embodiment, from the viewpoint of obtaining the effect of the present invention, as an example of the combination of the compound (1) and the polymerization reactive compound, the compound (1) is preferably a compound represented by Formula (2) or Formula (3); the polymerization reactive compound is preferably one type or two or more types of compounds selected from a polyiso(thio)cyanate compound, a poly(thio)epoxy compound, a polyoxetanyl compound, a polythietanyl compound, a poly(meth)acryloyl compound, a polyalkene compound, an alkyne compound, a poly(thi)ol compound, a polyamine compound, an acid anhydride, or a polycarboxylic acid compound; and more preferably includes a polyiso(thio)cyanate compound; and even more preferably a combination including a polyiso(thio)cyanate compound and a poly(thi)ol compound.

[Other Components Such as Additives]

The composition of the present embodiment may include components other than the polymerization reactive compound described above. Examples thereof include monofunctional iso (thio) cyanate compounds, monofunctional (thio)epoxy compounds, monofunctional oxetanyl compounds, monofunctional thietanyl compounds, monofunctional (meth)acryloyl compounds having one functional group arbitrarily selected from methacryloyloxy groups, acryloyloxy groups, methacryloylthio groups, acryloylthio groups, methacryl amide groups, or acryl amide groups, monofunctional alkene compounds having one polymerizable carbon-carbon double bond other than methacryloyloxy groups, acryloyloxy groups, methacryloylthio groups, acryloylthio groups, methacrylamide groups, or acrylamide groups, monofunctional alcohol compounds, monofunctional thiol compounds, monofunctional amine compounds having one functional group arbitrarily selected from amino groups, and secondary amino groups, and a monofunctional carbonate compound having one carboxylic group, and the like.

In the process of cast polymerizing the composition of the present embodiment to manufacture a molded product, as necessary, a polymerization catalyst or a thermal polymerization initiator is added in a case of curing by heat, and a photopolymerization initiator is added in a case of curing by radiation other than infrared rays (heat) such as ultraviolet light.

Examples of the polymerization catalyst include Lewis acids, amines, tertiary amine compounds, inorganic acid salts or organic acid salts thereof, metal compounds, quaternary ammonium salts, organic sulfonic acids, and the like.

The used amount of the polymerization catalyst is preferably in a range of 5 ppm to 15% by weight with respect to the polymerizable composition, more preferably in a range of 10 ppm to 10% by weight, and even more preferably in a range of 50 ppm to 3% by weight.

Examples of the metal compound to be used as the polymerization catalyst include dimethyltin chloride, dibutyltin chloride, dibutyltin laurate, and the like.

Examples of the thermal polymerization initiator to be used include ketone peroxide compounds such as methyl isobutyl ketone peroxide and cyclohexanone peroxide; diacyl peroxide compounds such as isobutyryl peroxide, o-chlorobenzoyl peroxide, and benzoyl peroxide; dialkyl peroxide compounds such as tris(t-butylperoxy)triazine and t-nuthylcumyl peroxide; peroxyketal compounds such as 1,1-di(t-hexylperoxy)cyclohexane, 2,2-bis(4,4-di-t-butylperoxycyclohexyl)propane, and 2,2-di(t-butylperoxy)butane; alkyl perester compounds such as α-cumylperoxyneodecanoate, t-butylperoxypivalate, 2,4,4-trimethylpentylperoxy-2-ethylhexanoate, t-butylperoxy-2-ethylhexanoate, and t-butylperoxy-3,5,5-trimethylhexanoate; peroxycarbonate compounds such as di-3-methoxybutylperoxydicarbonate, bis(4-t-butylcyclohexyl)peroxydicarbonate, t-butylperoxyisopropylcarbonate, diethylene glycol bis(t-butylperoxycarbonate), and the like.

Examples of the photopolymerization initiator to be used include a photoradical polymerization initiator, a photocationic polymerization initiator, a photoanionic polymerization initiator, and the like; however, among these photopolymerization initiators, a photoradical polymerization initiator is preferable.

Examples of the photoradical polymerization initiator include Irgacure 127 (manufactured by BASF), Irgacure 651 (manufactured by BASF), Irgacure 184 (manufactured by BASF), Darocur 1173 (manufactured by BASF), benzophenone, 4-phenylbenzophenone, Irgacure 500 (manufactured by BASF), Irgacure 2959 (manufactured by BASF), Irgacure 907 (manufactured by BASF), Irgacure 369 (manufactured by BASF), Irgacure 1300 (manufactured by BASF), Irgacure 819 (manufactured by BASF), Irgacure 1800 (manufactured by BASF), Darocur TPO (manufactured by BASF), Darocur 4265 (manufactured by BASF), Irgacure OXE01 (manufactured by BASF), Irgacure OXE02 (manufactured by BASF), Esacure KT55 (manufactured by Lamberti), Esacure ONE (manufactured by Lamberti), Esacure KIP150 (manufactured by Lamberti), Esacure KIP100F (manufactured by Lamberti), Esacure KT37 (manufactured by Lamberti), Esacure KTO46 (manufactured by Lamberti), Esacure 1001M (manufactured by Lamberti), Esacure KIP/EM (manufactured by Lamberti), Esacure DP250 (manufactured by Lamberti), Esacure KB1 (manufactured by Lamberti), 2,4-diethylthioxanthone, and the like.

Among these photoradical polymerization initiators, Irgacure 127 (manufactured by BASF), Irgacure 184 (manufactured by BASF), Darocur 1173 (manufactured by BASF), Irgacure 500 (manufactured by BASF), Irgacure 819 (manufactured by BASF), Darocur TPO (manufactured by BASF), Esacure ONE (manufactured by Lamberti), Esacure KIP100F (manufactured by Lamberti), Esacure KT37 (manufactured by Lamberti), Esacure KT046 (manufactured by Lamberti), and the like are preferable.

Examples of the photocationic polymerization initiator include Irgacure 250 (manufactured by BASF), Irgacure 784 (manufactured by BASF), Esacure 1064 (manufactured by Lamberti), CYRACURE UVI 6990 (manufactured by Union Carbide Japan), Adeka Optomer SP-172 (manufactured by ADEKA), Adeka Optomer SP-170 (manufactured by ADEKA), Adeka Optomer SP-152 (manufactured by ADEKA), Adeka Optomer SP-150 (manufactured by ADEKA), and the like.

In a case of using the photopolymerization initiator, photopolymerization accelerators may be used in a combination. Examples of the photopolymerization accelerator include 2,2-bis(2-chlorophenyl)-4,5'-tetraphenyl-2'H-<1,2'> biimidazole, tris(4-dimethylaminophenyl)methane, 4,4'-bis(dimethylamino) benzophenone, 2-ethylanthraquinone, camphorquinone, and the like.

The used amount of the photopolymerization initiator and thermal polymerization initiator in the polymerizable composition is preferably in the range of 0.1 to 20% by weight, more preferably in the range of 0.5 to 10% by weight, and even more preferably in the range of 1 to 5% by weight.

In the process of cast polymerizing the composition of the present embodiment to manufacture a molded product, an internal mold release agent may be added as necessary.

As the internal mold release agent, it is possible to use an acidic phosphate ester. Examples of acidic phosphate esters include phosphoric acid monoesters and phosphoric acid diesters, which are able to be used individually or in a combination of two or more types.

It is possible to represent the acidic phosphate esters used as an internal mold release agent by General Formula (5).

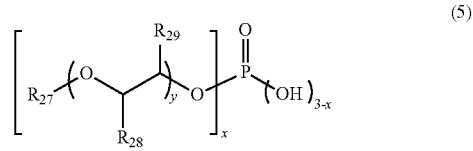

In General Formula (5), x represents an integer of 1 or 2, y represents an integer of 0 to 18, $R_{27}$ represents an alkyl group having 1 to 20 carbon atoms, and $R_{28}$ and $R_{29}$ each independently represent a hydrogen atom, a methyl group, and an ethyl group. The number of carbon atoms in [ ]x is preferably 4 to 20. A plurality of present $R_{27}$s, a plurality of present $R_{28}$s, or a plurality of present $R_{29}$s may be the same or different.

$R_{27}$ in General Formula (5) is, for example, organic residues derived from linear aliphatic compounds such as methane, ethane, propane, butane, pentane, hexane, heptane, octane, nonane, decane, undecane, dodecane, tetradecane, and hexadecane, organic residues derived from branched aliphatic compounds such as 2-methylpropane, 2-methylbutane, 2-methylpentane, 3-methylpentane, 3-ethylpentane, 2-methylhexane, 3-methylhexane, 3-ethylhexane, 2-methylheptane, 3-methylheptane, 4-methylheptane, 3-ethylheptane, 4-ethylheptane, 4-propylheptane, 2-methyloctane, 3-methyloctane, 4-methyloctane, 3-ethyloctane, 4-ethyloctane, and 4-propyloctane, organic residues derived from alicyclic compounds such as cyclopentane, cyclohexane, 1,2-dimethylcyclohexane, 1,3-dimethylcyclohexane, and 1,4-dimethylcyclohexane, and the like and it is possible to use at least one type selected from the above. In addition, the present invention is not limited only to these exemplified compounds. As the acidic phosphate ester, it is possible to use at least one type or a mixture of two or more types.

In General Formula (5), y is preferably 0 or 1.

In a case where y is 0, $R_{27}$ is preferably a linear or branched alkyl group having 4 to 12 carbon atoms and more preferably a linear alkyl group having 4 to 12 carbon atoms.

In a case where y is 1, $R_{27}$ is preferably a linear or branched alkyl group having 1 to 20 carbon atoms and is preferably a linear or branched alkyl group having 3 to 12 carbon atoms.

It is possible to use the acidic phosphate ester as one type or a mixture of two or more types selected from the above.

As acidic phosphoric acid esters, it is possible to use ZelecUN (manufactured by Stepan), MR internal mold release agent (manufactured by Mitsui Chemicals, Inc.), JP series manufactured by Johoku Chemical Co., Ltd., Phosphanol series manufactured by Toho Chemical Industry Co., Ltd., AP and DP series manufactured by Daihachi Chemical Industry Co., Ltd., and the like and ZelecUN (manufactured by STEPAN) and MR internal mold release agent (manufactured by Mitsui Chemicals, Inc.) are more preferable.

In order to prevent a molded product comprised of the cured resin of the present embodiment from changing even when exposed to the outside for a long period of time, it is desirable that an ultraviolet absorber and a hindered amine light stabilizer are further added to the composition of the present embodiment and the composition is imparted with the weather resistance.

The ultraviolet absorber is not particularly limited, for example, it is possible to use various ultraviolet absorbers such as a benzotriazole ultraviolet absorber, a triazine ultraviolet absorber, a benzophenone ultraviolet absorber, a benzoate ultraviolet absorber, a propanedioic acid ester ultraviolet absorber, or an oxanilide ultraviolet absorber.

Specifically, examples thereof include benzotriazole ultraviolet absorbers such as 2-(2H-benzotriazol-2-yl)-4-methyl-6-(3,4,5,6-tetrahydrophthalibidylmethyl)phenol, 2-(2H-benzotriazole-2-yl)-p-cresol, 2-(2H-benzotriazol-2-yl)-4-tert-butylphenol, 2-(2H-benzotriazol-2-yl)-4,6-di-tert-butylphenol, 2-(2H-benzotriazol-2-yl)-4,6-bis(1-methyl-1-phenylethyl)phenol, 2-(2H-benzotriazol-2-yl)-4-(1,1,3,3-tetramethylbutyl)-6-(1-methyl-1-phenylethyl)phenol, 2-(2H-benzotriazol-2-yl)-4-(3-one-4-oxa-dodecyl)-6-tert-butyl-phenol, 2-{5-chloro (2H)-benzotriazol-2-yl}-4-(3-one-4-oxa-dodecyl)-6-tert-butyl-phenol, 2-{5-chloro (2H)-benzotriazol-2-yl}-4-methyl-6-tert-butyl-phenol, 2-(2H-benzotriazol-2-yl)-4,6-di-tert-pentylphenol, 2-{5-chloro (2H)-benzotriazol-2-yl}-4,6-di-tert-butylphenol, 2-(2H-benzotriazol-2-yl)-4-tert-octylphenol, 2-(2H-benzotriazol-2-yl)-4-methyl-6-n-dodecylphenol, 3-[3-tert-butyl-5-(5-chloro-2H-benzotriazol-2-yl)-4-hydroxyphenyl]octyl propionate, 3-[3-tert-butyl-5-(5-chloro-2H-benzotriazol-2-yl)-4-hydroxyphenyl]propionate 2-ethylhexyl, reaction products of methyl-3-{3-(2H-benzotriazol-2-yl)-5-tert-butyl-4-hydroxyphenyl}propionate/polyethylene glycol 300, trade name Viosorb 583 (manufactured by Kyodo Chemical Co., Ltd.), trade name Tinuvin 326 (manufactured by BASF), trade name Tinuvin 384-2 (manufactured by BASF), trade name Tinuvin PS (manufactured by BASF), trade name Seesorb 706 (manufactured by Shipro Kasei Kaisha, Ltd.), and trade name EVERSORB109 (manufactured by Everlight Chemical Industrial Corp.); triazine ultraviolet absorbers such as 2-(4-phenoxy-2-hydroxy-phenyl)-4,6-diphenyl-1,3,5-triazine, 2-(2-hydroxy-4-oxa-hexadecyloxy)-4,6-di(2,4-dimethyl-phenyl)-1,3,5-triazine, 2-(2-hydroxy-4-oxa-heptadecyloxy)-4,6-di(2,4-dimethyl-phenyl)-1,3,5-triazine, 2-(2-hydroxy-4-iso-octyloxy-phenyl)-4,6-di(2,4-dimethyl-phenyl)-1,3,5-triazine, trade name Tinuvin 400 (manufactured by BASF), trade name Tinuvin 405 (manufactured by BASF), trade name Tinuvin 460 (manufactured by BASF), and trade name Tinuvin 479 (manufactured by BASF); benzophenone ultraviolet absorbers such as 2-hydroxy-4-n-methoxybenzophenone and 2-hydroxy-4-n-octoxybenzophenone; benzoate ultraviolet absorbers such as 2,4-di-tert-butylphenyl-3,5-di-tert-butyl-4-hydroxybenzoate; propanedioic acid ester ultraviolet absorbers such as propanediocic acid-{(4-methoxyphenyl)-methylene}-dimethyl ester, trade name Hostavin PR-25 (manufactured by Clariant Japan), and trade name Hostavin B-CAP (manufactured by Clariant Japan); oxanilide ultraviolet absorbers such as 2-ethyl-2'-ethoxy-oxanilide and trade name Sanduvor VSU (manufactured by Clariant Japan). Among these ultraviolet absorbers, benzotriazole and triazine ultraviolet absorbers tend to be preferable.

The hindered amine light stabilizers (abbreviated as HALS) described above are not particularly limited, but generally represent a general term for compounds having a 2,2,6,6-tetramethylpiperidine skeleton in many cases and are broadly classified by molecular weight into low molecular weight HALS, medium molecular weight HALS, high molecular weight HALS, and reactive type HALS.

Specifically, examples of the hindered amine light stabilizers include trade name Tinuvin 111FDL (manufactured by BASF), bis(1-octyloxy-2,2,6,6-tetramethyl-4-piperidyl)sebacate (trade name Tinuvin 123 (manufactured by BASF)), trade name Tinuvin 144 (manufactured by BASF), trade name Tinuvin 292 (manufactured by BASF), trade name Tinuvin 765 (manufactured by BASF), trade name Tinuvin 770 (manufactured by BASF), N,N'-bis(3-aminopropyl)ethylenediamine-2,4-bis[N-butyl-N-(1,2,2,6,6-pentamethyl-4-piperidyl)amino]-6-chloro-1,3,5-triazine condensate (trade name CHIMASSORB119FL (manufactured by BASF)), trade name CHIMASSORB2020FDL (manufactured by BASF)), dimethyl succinate-1-(2-hydroxyethyl)-4-hydroxy-2,2,6,6-tetramethylpiperidine polycondensate (trade name CHIMASSORB 622LD (manufactured by BASF)), poly[{6-(1,1,3,3-tetramethyl-butyl)amino-1,3,5-triazine-2,4-diyl}{(2,2,6,6-tetramethyl-4-piperidyl)imino}hexamethylene {(2,2,6,6-tetramethyllauryl-4-piperidyl)imino}](trade name CHIMASSORB 944FD (manufactured by BASF)), trade name Sanduvor 3050 Liq. (manufactured by Clariant Japan), trade name Sanduvor 3052 Liq. (manufactured by Clariant Japan), trade name Sanduvor 3058 Liq. (manufactured by Clariant Japan), trade name Sanduvor 3051 Powder. (manufactured by Clariant Japan), trade name Sanduvor 3070 Powder. (manufactured by Clariant Japan), trade name VP Sanduvor PR-31 (manufactured by Clariant Japan), trade name Hostavin N20 (manufactured by Clariant Japan), trade name Hostavin N24 (manufactured by Clariant Japan), trade name Hostavin N30 (manufactured by Clariant Japan), trade name Hostavin N321 (manufactured by Clariant Japan), trade name Hostavin PR-31 (manufactured by Clariant Japan), trade name Hostavin 845 (manufactured by Clariant Japan), trade name Nylostab S-EED (manufactured by Clariant Japan), and the like.

The added amount of the ultraviolet absorber and the hindered amine light stabilizer described above is not particularly limited, but the ultraviolet absorber in the polymerizable composition is usually 0.1 to 20% by weight, and preferably 0.5 to 10% by weight, and the hindered amine light stabilizer is usually in the range of 0.1 to 10% by weight, preferably 0.5 to 5% by weight, and more preferably 1 to 3% by weight.

In a case where the added amount of the ultraviolet absorber and the hindered amine light stabilizer is in the above range, the effect of improving the weather resistance of the cured resin obtained by polymerizing the composition of the present embodiment and the molded product comprised of the resin is increased. In a case where the added amount of the ultraviolet absorber or the hindered amine light stabilizer is less than the above range, the effect of improving the weather resistance of the obtained molded product may be reduced. On the other hand, in a case where the added amount of the ultraviolet absorber or the hindered amine light stabilizer exceeds the above range, it may be insufficient when the composition including the polymerization reactive compound is polymerized with radiation such as UV.

Furthermore, for the purpose of imparting light control properties, a light control dye or a light control pigment may be added. As typical light control dyes or light control pigments, for example, it is possible to use one type or two or more types of spiropyran compounds, spirooxazine compounds, fulgide compounds, naphthopyran compounds, and bisimidazole compounds depending on the desired coloration.

Examples of the spiropyran compounds include various substituents in which indole rings and benzene rings of indolinospirobenzopyran are substituted with halogen, methyl, ethyl, methylene, ethylene, hydroxyl groups, and the like, various substituents in which indole rings and naphthalene rings of indolinospironaphthopyran are substituted with halogen, methyl, ethyl, methylene, ethylene, hydroxyl group, and the like, various substituents in which indole rings of indolinospiroquinolinopyran are substituted with halogen, methyl, ethyl, methylene, ethylene, hydroxyl group, and the like, various substituents in which indole rings of indolinospiropyridopyran are substituted with halogen, methyl, ethyl, methylene, ethylene, hydroxyl group and the like, and the like.

Examples of the spirooxazine compounds include various substituents in which indole rings and benzene rings of indolinospirobenzoxazine are substituted with halogen, methyl, ethyl, methylene, ethylene, hydroxyl group, and the like, various substituents in which indole rings and naphthalene rings of indolinospironaphthoxazine are substituted with halogen, methyl, ethyl, methylene, ethylene, hydroxyl group, and the like, various substituents in which indole rings of indolinospirophenanthrooxazine are substituted with halogen, methyl, ethyl, methylene, ethylene, hydroxyl group, and the like, various substituents in which indole rings of indolinospiroquinolinoxazine are substituted with halogen, methyl, ethyl, methylene, ethylene, hydroxyl group, and the like, various substituents in which piperidine rings and naphthalene rings of piperidinospironaphthoxazine are substituted with halogen, methyl, ethyl, methylene, ethylene, hydroxyl group, and the like, and the like.

Examples of the fulgide compound include N-cyanomethyl-6,7-dihydro-4-methyl-2-phenylspiro (5,6-benzo[b] thiophenedicarboximide-7,2'-tricyclo[3.3.1.1$^{3,7}$]decane], N-cyanomethyl-6,7-dihydro-2-(p-methoxyphenyl)-4-methylspiro (5,6-benzo[b]thiophenedicarboximide-7,2'-tricyclo [3.3.1.1$^{3,7}$]decane), 6,7-dihydro-N-methoxycarbonylmethyl-4-methyl-2-phenylspiro (5,6-benzo[b] thiophenedicarboximide-7,2'-tricyclo[3.3.1.1$^{3,7}$]decane), 6,7-dihydro-4-methyl-2-(p-methylphenyl)-N-nitromethyl-spiro (5,6-benzo[b]thiophenedicarboximide-7,2'-tricyclo [3.3.1.1$^{3,7}$]decane), N-cyanomethyl-6,7-dihydro-4-cyclopropyl-3-methylspiro (5,6-benzo[b] thiophenedicarboximide-7,2'-tricyclo[3.3.1.1$^{3,7}$]decane), N-cyanomethyl-6,7-dihydro-4-cyclopropylspiro (5,6-benzo [b]thiophenedicarboximide-7,2'-tricyclo[3.3.1.1$^{3,7}$]decane), N-cyanomethyl-6,7-dihydro-2-(p-methoxyphenyl)-4-cyclopropylspiro (5,6-benzo[b]thiophenedicarboximide-7,2'-tricyclo[3.3.1.1$^{3,7}$]decane), and the like.

Examples of the naphthopyran compounds include spiro [norbornane-2,2'-[2H]benzo[h]chromene], spiro[bicyclo [3.3.1]nonane-9,2'-[2H]benzo[h]chromene], 7'-methoxyspiro[bicyclo[3.3.1]nonane-9,2'-[2H]benzo[h]chromene], 7'-methoxyspiro[norbornane-2,2'-[2H]benzo[f]chromene], 2,2-dimethyl-7-octoxy[2H]benzo[h]chromene, spiro[2-bicyclo[3.3.1]nonene-9,2'-[2H]benzo[h]chromene], spiro[2-bicyclo[3.3.1]nonene-9,2'-[2H]benzo[f]chromene], 6-morpholino-3,3-bis(3-fluoro-4-methoxyphenyl)-3H-benzo (f) chrome, 5-isopropyl-2,2-diphenyl-2H-benzo (h) chromene, and the like.

The added amount of these light control dyes or light control pigments is not particularly limited, but is in the range of approximately 0.01 to 10000 ppm (by weight) with respect to the composition containing the polymerization reactive compound, preferably in the range of 0.1 to 1000 ppm (by weight), and even more preferably in the range of 1 to 100 ppm (weight).

As necessary, various additives such as a polymerization accelerator, a catalyst, an infrared absorber, a radical scavenger, an antioxidant, a polymerization inhibitor, a non-light controlling dye and pigment, a binder, a dispersant, an antifoaming agent, nanometer-sized organic or inorganic particles, or the like may also be added to the composition of the present embodiment.

According to the polymerizable composition for an optical material of the present embodiment including the compound (1), it is possible to provide an optical material having a very strong transmission suppression effect on blue light having a wavelength of approximately 420 nm by adding a smaller amount than the added amount of the ultraviolet absorber used in the field of optical materials in the related art, and it is possible to suppress the transmission of visible light up to an arbitrary wavelength depending on the blending amount. Furthermore, it is possible to provide an optical material, in particular, a plastic spectacle lens, comprised of a resin base material which is colorless and transparent, which has an excellent appearance, and which has excellent optical characteristics such as a high refractive index and a high Abbe number and various physical characteristics such as heat resistance.

A cured resin obtained by heat polymerization (curing) of the composition of the present embodiment and a molded product comprised of the resin are manufactured through the addition of the polymerization reactive compound and, as necessary, the various additives and the like described above. In addition, polymerization reactive compounds, additives, and the like which are not described in the present application may be added to the composition of the present embodiment in a range in which the effects of the present embodiment are not impaired.

The cured resin forming the molded product (resin base material) of the present embodiment is preferably a cured resin obtained from a liquid polymerizable composition for which a casting operation is easy and, among these cured resins, the cured resins described in the following (a) to (z) are preferable.

(a) Poly(thio)urethane resin obtained by polymerizing a polyiso(thio)cyanate compound and a poly(thi)ol compound In the present application, poly(thio)urethane resin means polyurethane resin, polythiourethane resin, and polydithiourethane resin.

(b) Poly(thio)urea resin obtained by polymerizing a polyisocyanate compound or a polyisothiocyanate compound and a polyamine compound In the present application, poly(thio) urea resin means polyurea resin and polythiourea resin.

(c) Poly(thio)epoxy resin obtained by polymerizing a poly(thio)epoxy compound (d) Poly(thio)epoxy-poly(thi)ol resin obtained by polymerizing a poly(thio)epoxy compound and a poly(thi)ol compound (e) Poly(thio)epoxy-polyamine resin obtained by polymerizing a poly(thio)epoxy compound and a polyamine compound (f) Poly(thio)epoxy-anhydride resin obtained by polymerizing a poly(thio)epoxy compound and an acid anhydride (g) Poly(meth)acryloyl resin obtained by polymerizing a poly(meth)acryloyl compound (h) Poly(meth)acryloyl-poly(thi)ol resin obtained by polymerizing poly(meth)acryloyl compound and poly(thi)ol compound (i) Poly(meth)acryloyl-polyalkene resin obtained by polymerizing a poly(meth)acryloyl compound and a polyalkene compound (j) Poly(meth)acryloyl-polyalkyne resin obtained by polymerizing a poly(meth)acryloyl compound and an alkyne compound (k) Poly(meth)acryloyl-polyamine resin obtained by polymerizing a poly(meth)acryloyl compound and a polyamine compound (l) Polyalkene resin obtained by polymerizing a polyalkene compound (m) Polyalkene-poly(thi)ol resin obtained by polymerizing a polyalkene compound and a poly(thi)ol compound (n) Polyalkene-polyamine resin obtained by polymerizing a polyalkene compound and a polyamine compound (o) Polyalkyne resin obtained by polymerizing an alkyne compound (p) Polyalkyne-poly(thi)ol resin obtained by polymerizing an alkyne compound and a poly(thi)ol compound (q) Polyalkyne-polyamine resin obtained by polymerizing an alkyne compound and a polyamine compound (r) Polyalkyne-polyalkene resin obtained by polymerizing an alkyne compound and a polyalkene compound (s) Polyoxetanyl resin obtained by polymerizing a polyoxetanyl compound (t) Polyoxetanyl-poly(thi)ol resin obtained by polymerizing a polyoxetanyl compound and a poly(thi)ol compound (u) Polyoxetanyl-polyamine resin obtained by polymerizing a polyoxetanyl compound and a polyamine compound (v) Polyoxetanyl-acid anhydride resin obtained by polymerizing a polyoxetanyl compound and an acid anhydride (w) Polythietanyl-poly(thi)ol resin obtained by polymerizing a polythietanyl compound and a poly(thi)ol compound (x) Polythietanyl-polyamine resin obtained by polymerizing a polythietanyl compound and a polyamine compound (y) Polythietanyl-acid anhydride resin obtained by polymerizing a polythietanyl compound and an acid anhydride (z) Mixed resin in which two or more types selected from (a) to (y) are copolymerized Among the cured resins in (a) to (z) described above, more preferable cured resins include the resins described in (a) to (i) and (s) to (z) and mixed resins thereof (mixtures of copolymers and resin) and even more preferable cured resins include the cured resins described in (a) to (f), (s) to (v), and (z) and mixed resins thereof.

<Optical Material>

In the present embodiment, it is possible to obtain various shapes of molded products by changing the mold during polymerization. It is possible to use the resin base material comprised of the molded product of the present embodiment as various optical materials by setting a desired shape and providing a coat layer, other members, and the like formed as necessary.

In addition, the process for producing an optical material in the present embodiment includes, for example, a step of cast polymerizing the polymerizable composition of the present embodiment.

Examples of the optical material include a plastic lens, a light emitting diode (LED), a prism, an optical fiber, an information recording substrate, a filter, a light emitting diode, and the like. In particular, the resin base material is suitable as a plastic lens.

A description will be given of the plastic lens comprised of the molded product of the present embodiment. It is possible to manufacture the plastic lens as follows.

<Process for Producing Plastic Lens>

The plastic lens of the present embodiment is usually produced by a casting polymerization method using the composition described above.

Specifically, first, the compound (1) is added to a composition including a polymerization reactive compound, mixed and stirred, and degassed under reduced pressure as necessary.

For example, in a case where a poly(thio)urethane resin is manufactured from a polyiso(thio)cyanate compound and a poly(thi)ol compound, since the solubility of the compound (1) in the poly(thi)ol compound may be low, a process in which the compound (1) is completely dissolved in the polyiso(thio)cyanate compound in advance and then the poly(thi)ol compound is mixed therein is preferable.

The obtained composition of the present embodiment is poured into a cavity formed of a glass mold and a gasket or tape and polymerized and cured by heat or irradiation with radiation such as ultraviolet light other than infrared rays to manufacture the resin base material of the present embodiment and a plastic lens comprised of the resin base material.

In a case of manufacturing the resin base material of the present embodiment and the plastic lens comprised of the resin base material by heating, for the purpose of preventing polymerization non-uniformity (striae) due to convection, the heating is usually gradually increased from a low temperature so as to carry out polymerization over several days. As examples of typical heating conditions, the temperature is gradually raised from a low temperature in the range of 0 to 200° C.° for 64 hours, similarly in the range of 5 to 150° C. for 40 hours, or similarly in the range of 20 to 120° C. for 16 hours.

In the same manner as a case of polymerizing by radiation such as UV, in order to prevent polymerization nonuniformity (striae) due to convection, the polymerization is usually performed gradually by dividing the irradiation of radiation or by reducing the illuminance. In order to prevent more convection from occurring, a dual cure method or the like may be adopted in which, after pouring a uniform polymerizable reaction composition into the cavity, cooling is carried out once to form a state in which convection does not easily occur, and then a semi-cured composition formed in a uniform gel state by irradiation with weak radiation is completely cured by heating.

The plastic lens obtained by releasing from the mold may be subjected to a reheating process (annealing) as necessary for a purpose such as completing polymerization or removing distortion due to residual stress and the like. Usually, the heating process is performed in a range of 1 to 24 hours at a temperature of the Tg of the obtained plastic lens to twice the Tg. More preferably, the heating process conditions are 1 to 16 hours at a temperature of Tg to 1.5 times the Tg and, even more preferably, the heating process conditions are 1 to 4 hours at a temperature of Tg to 1.2 times the Tg.

In a case of manufacturing the resin base material of the present embodiment and the plastic lens comprised of the resin base material by radiation, energy rays having a wavelength region in a range of 0.0001 to 800 nm are usually used as the radiation to be used. The radiation is classified into α-rays, β-rays, γ-rays, X-rays, electron beams, ultraviolet light, visible light, and the like and is able to be appropriately selected and used according to the composition of the mixture. Among the above radiation, ultraviolet light is preferable, and the output peak of ultraviolet light is preferably in a range of 200 to 450 nm, more preferably in a range of 230 to 445 nm, even more preferably in a range of 240 to 430 nm, and particularly preferably in a range of 250 to 400 nm. In a case where ultraviolet light in the output peak ranges described above is used, there are few defects such as yellowing and thermal deformation during polymerization and it is possible to complete the polymerization in a comparatively short time even in a case where an ultraviolet absorber is added.

Further, in a case where an ultraviolet absorber or a hindered amine light stabilizer is added to the composition described above, it tends to be preferable to use ultraviolet light having an ultraviolet light energy output peak in the range of 250 to 280 nm or in the range of 370 to 430 nm.

The resin base material of the present embodiment obtained in this manner and the plastic lens comprised of the resin base material may be imparted with various types of functionality by being provided with a functional coating layer such as a hard coat layer, an antireflection layer, a light control layer, a slipperiness-imparting layer, and an antistatic layer on the surface thereof, being subjected to a dyeing process for fashionability, being subjected to a surface and edge polishing process or the like, or being processed by adding a polarizing film to the inside or pasting a polarizing film on the surface thereof for the purpose of imparting polarization.

Further, for the purpose of improving the adhesion between the functional coat layer and the base material, and the like, it is also possible to subject the surface of the obtained resin base material of the present embodiment and the plastic lens comprised of the resin base material to a physical or chemical process such as a corona process, an ozone process, a low-temperature plasma process using oxygen gas or, nitrogen gas, or the like, a glow discharge process, an oxidation process with chemicals or the like, or a flame process.

In addition, instead of or in addition to these processes, a primer layer formed by a primer process, an undercoat process, an anchor coat process, or the like may be provided between the surface of the resin base material of the present embodiment and the plastic lens comprised of the resin base material and an outermost layer (surface in contact with the atmosphere) formed by the above physical or chemical process or the like.

In the present embodiment, in addition to the resin base material, it is also possible to include the compound (1) in a layer such as a functional coat layer or a primer layer. The content of the compound (1) is adjusted such that the total of the resin base material and the layer is in the ranges described above.

As the coating agent used for the primer layer described above, it is possible to use a coating agent in which the main component of the vehicle was a resin such as polyester resins, polyamide resins, polyurethane resins, epoxy resins, phenol resins, (meth)acrylic resins, polyvinyl acetate resins, polyolefin resins such as polyethylene and polypropylene, copolymers and modified resins thereof, and cellulose resins. The coating agent may be either a solvent type coating agent or an aqueous type coating agent.

Preferable among these coating agents are modified polyolefin coating agents, ethyl vinyl alcohol coating agents, polyethyleneimine coating agents, polybutadiene coating agents, and polyurethane coating agents; polyester polyurethane emulsion coating agents, polyvinyl chloride emulsion coating agents, retane acrylic emulsion coating agents, silicone acrylic emulsion coating agents, vinyl acetate acrylic emulsion coating agents, and acrylic emulsion coating agents; styrene-butadiene copolymer latex coating agents, acrylonitrile-butadiene copolymer latex coating agents, methyl methacrylate-butadiene copolymer latex coating agents, chloroprene latex coating agents, rubber-based latex coating agents of polybutadiene latex, polyacrylic acid ester latex coating agents, polyvinylidene chloride latex coating agents, polybutadiene latex coating agents, or coating agents comprised of a carboxylic acid-modified latex or a dispersion of a resin included in these latex coating agents.

It is possible to coat these coating agents by, for example, a dipping coating method, a spin coating method, a spray coating method, or the like and the coating amount on the base material is usually 0.05 $g/m^2$ to 10 $g/m^2$ in a dry state.

Among these coating agents, polyurethane coating agents are more preferable. The polyurethane coating agent has a urethane bond in the main chain or side chain of the resin included in the coating agent. The polyurethane coating agent is, for example, a coating agent including a polyurethane obtained by reacting polyols such as polyester polyol, polyether polyol, or acrylic polyol and an isocyanate compound.

Among these polyurethane coating agents, polyurethane coating agents obtained by mixing polyester polyols such as condensation polyester polyols and lactone polyester polyols with isocyanate compounds such as tolylene diisocyanate, hexamethylene diisocyanate, and xylene diisocyanate are excellent in adhesion, which is preferable.

The process of mixing the polyol compound and the isocyanate compound is not particularly limited. In addition, the blending ratio is also not particularly limited, but, when the isocyanate compound is excessively small, curing defects may occur, thus, the OH group of the polyol compound and the NCO group of the isocyanate compound are preferably in a range of 2/1 to 1/40 in terms of equivalents.

The cured resin of the present embodiment may have applications other than plastic lenses and examples of applications other than plastic lenses include sheets and films manufactured in the same manner as a plastic lens using a planar mold. Sheets, films, and the like comprised of the curing resin of the present embodiment may be physically or chemically processed on the surfaces thereof in the same manner as the plastic lenses and the primer layer and the functional outermost layer (surface in contact with the atmosphere) formed by a physical or chemical process or the like may be laminated.

The plastic lens comprised of the resin base material of the present embodiment may be a laminate including the primer layer between the functional outermost layer (surface in contact with the atmosphere) formed by the physical or chemical process or the like and the cured resin surface.

Second Embodiment

The optical material of the second embodiment is a laminate of a resin base material and a layer. In the present embodiment, the resin base material does not include the compound (1) and the compound (1) is included in the layer.

In the present embodiment, the resin base material and the producing process thereof and the plastic lens and the producing process thereof are the same as in the first embodiment except that the compound (1) is not included and thus description thereof will not be repeated.

Examples of the layer include a hard coat layer, an antireflection layer, a light control layer, a slipperiness-imparting layer, a functional coating layer such as an antistatic layer, a primer layer, and the like.

The amount of the compound (1) included in the layer is in a range of 0.0001% by weight to 10% by weight with respect to 100 parts by weight of the composition forming the layer, preferably 0.001% by weight to 5% by weight, and more preferably 0.005% by weight to 1% by weight.

It is possible for the compound (1) to exhibit the effect of suppressing the transmission of light in the vicinity of 420 nm, even with a smaller amount than the added amount of the ultraviolet absorber used in the field of optical materials in the related art. Therefore, it is possible to suppress problems in the optical material such as the generation of white turbidity caused by additives, deteriorating in heat resistance and Abbe number, and the like and also to reduce the manufacturing cost.

It is possible to use the plastic lens of the present embodiment obtained in this manner for various lens applications such as a spectacle lens, a camera lens, a pickup lens, a Fresnel lens, a prism lens, and a lenticular lens. Among the above, particularly preferable applications include spectacle lenses, camera lenses, and pickup lenses having smooth surfaces. In Fresnel lenses and prism lenses with a complex shape with a surface which is not smooth, bubbles are likely to form in the vicinity of the interface with the mold (in the vicinity of the lens surface after the mold release), and in lenticular lenses or the like formed with multiple layers, it is difficult for the interface in the vicinity of the multiple layers to be uniform, thus, these applications require further contrivance in addition to the internal mold release agent of the present embodiment.

In the same manner, it is possible to use the sheet and film of the present embodiment obtained for various flat member applications which require high transparency, such as display members such as a flat panel and a smart phone panel, film members, such as a scattering prevention film, a specific wavelength cut film, and a film for decoration, and glass substitute members such as building material window glass, vehicle window glass, and mirrors.

Examples of the optical material of the present embodiment include various plastic lenses such as plastic spectacle lenses, goggles, eyesight correction spectacle lenses, imaging device lenses, liquid crystal projector Fresnel lenses, lenticular lenses, and contact lenses, prisms, optical fibers, information recording substrates, filters, light emitting diodes (LEDs), light emitting diode (LED) sealing materials, optical waveguides, optical lenses, optical adhesives used for bonding optical waveguides, antireflection films used for optical lenses or the like, transparent coatings used for liquid crystal display device members (a substrate, a light guide plate, a film, a sheet, and the like), a sheet or a film attached to the windshield of a car or a helmet for a motorcycle, a transparent substrate, and the like. In particular, it is possible to suitably use the optical material of the present embodiment as a plastic lens material for spectacles.

EXAMPLES

A detailed description will be given of the present invention based on Examples, but the present invention is not limited to these Examples. The evaluation of the cured resin was carried out by the following method.

Measurement method of light transmittance at a wavelength of 420 nm: Shimadzu spectrophotometer UV-1600 manufactured by Shimadzu Corporation was used as a measuring device and the measurement was performed using a 2 mm thick resin flat plate.

Example 1

Into a sufficiently-dried flask, 0.03 parts by weight of dibutyltin dichloride, 0.08 parts by weight of ZelecUN (manufactured by STEPAN), 0.05 parts by weight of the compound represented by Formula (2), and 49.6 parts by weight of a mixture of 2,5-bis(isocyanatomethyl)-bicyclo[2,2,1]heptane and 2,6-bis(isocyanatomethyl)-bicyclo[2,2,1]heptane were added and the mixture was mixed and dissolved at 20° C. by stirring in a nitrogen atmosphere. Thereafter, into the mixed solution, 24.9 parts by weight of pentaerythritol tetrakis(3-mercaptopropionate) and 25.5 parts by weight of 4-mercaptomethyl-1,8-dimercapto-3,6-dithiaoctane were added and a mixed solution was prepared by stirring at 20° C. in a nitrogen atmosphere.

The mixed solution was degassed at 600 Pa for 1 hour and then filtered through a 1 μm PTFE filter. Thereafter, the obtained mixed solution was poured into a mold cavity formed of a flat plate glass mold having a diameter of 78 mm and a tape. This glass mold was put into an oven, gradually heated from 20° C. to 130° C., and polymerized over 21 hours. After cooling to room temperature, the glass mold was taken out from the oven and released to obtain a molded product. The obtained molded product was further annealed at 120° C. for 2 hours. Table 1 shows the evaluation results of the light transmittance of the obtained molded product at 420 nm.

Example 2

Into a sufficiently-dried flask, 0.03 parts by weight of dibutyltin dichloride, 0.1 parts by weight of ZelecUN (manufactured by STEPAN), 0.05 parts by weight of the compound represented by Formula (2), 35.2 parts by weight of a mixture of 2,4-tolylene diisocyanate and 2,6-tolylene diisocyanate, 18.3 parts by weight of hexamethylene diisocyanate were added and the mixed solution was mixed and dissolved at 20° C. by stirring in a nitrogen atmosphere. Thereafter, into this mixed solution, 31.9 parts by weight of pentaerythritol tetrakis(3-mercaptopropionate) and 14.6 parts by weight of 2-mercaptoethanol were added and the mixture was prepared by stirring at 20° C. in a nitrogen atmosphere.

The mixed solution was degassed at 600 Pa for 1 hour and then filtered through a 1 μm PTFE filter. Thereafter, the obtained mixed solution was poured into a mold cavity formed of a flat plate glass mold having a diameter of 78 mm and a tape. This glass mold was put into an oven, gradually heated from 20° C. to 130° C. and polymerized over 21 hours. After cooling to room temperature, the glass mold was taken out from the oven and peeled off to obtain a molded product. The obtained molded product was further annealed at 120° C. for 2 hours. Table 1 shows the evaluation results of the light transmittance of the obtained molded product at 420 nm.

Example 3

Into a sufficiently-dried flask, 0.05 parts by weight of the compound represented by Formula (2), 0.8 parts by weight of Luperox 531M80, and 100 parts by weight of diethylene glycol bisallyl carbonate were added and the mixture was mixed and dissolved at 20° C. by stirring in a nitrogen atmosphere.

The mixed solution was degassed at 600 Pa for 1 hour and then filtered through a 1 μm PTFE filter. Thereafter, the obtained mixed solution was poured into a mold cavity formed of a flat plate glass mold having a diameter of 78 mm and a tape. This glass mold was put into an oven, gradually heated from 40° C. to 120° C. and polymerized over 24 hours. After cooling to room temperature, the glass mold was taken out from the oven and peeled off to obtain a molded product. The obtained molded product was further annealed at 120° C. for 2 hours. Table 1 shows the evaluation results of the light transmittance of the obtained molded product at 420 nm.

Example 4

A molded product was produced in the same manner as Example 1 except that 0.10 parts by weight of the compound represented by Formula (3) was used instead of the compound represented by Formula (2) in Example 1. Table 1 shows the evaluation results of the light transmittance of the obtained molded product at 420 nm.

Example 5

A molded product was produced in the same manner as Example 2 except that 0.10 parts by weight of the compound represented by Formula (3) was used instead of the compound represented by Formula (2) in Example 2. Table 1 shows the evaluation results of the light transmittance of the obtained molded product at 420 nm.

Example 6

Into a sufficiently-dried flask, 0.10 parts by weight of the compound represented by Formula (3), 0.02 parts by weight of N,N-dimethylcyclohexylamine, 0.09 parts by weight of N,N-dicyclohexylmethylamine, 92.7 parts by weight of bis (2,3-epithiopropyl)disulfide, and 7.3 parts by weight of a mixture in which the main component was 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane were added and the mixture was mixed and dissolved at 20° C. by stirring in a nitrogen atmosphere.

The mixed solution was degassed at 600 Pa for 1 hour and then filtered through a 1 μm PTFE filter. Thereafter, the obtained mixed solution was poured into a mold cavity formed of a flat plate glass mold having a diameter of 78 mm and a tape. This glass mold was put into an oven, gradually heated from 20° C. to 100° C. and polymerized for 20 hours. After cooling to room temperature, the glass mold was taken out from the oven and peeled off to obtain a molded product. The obtained molded product was further annealed at 120° C. for 2 hours. Table 1 shows the evaluation results of the light transmittance of the obtained molded product at 420 nm.

Comparative Example 1

A molded product was produced in the same manner as Example 1 except that 0.05 parts by weight of 2-(2-hydroxy-3-t-butyl-5-methylphenyl)-chlorobenzotriazole was used instead of the compound represented by Formula (2) in Example 1. Table 1 shows the evaluation results of the light transmittance of the obtained molded product at 420 nm.

Comparative Example 2

A molded product was produced in the same manner as Example 1 except that 1.00 parts by weight of 2-(2-hydroxy-3-t-butyl-5-methylphenyl)-chlorobenzotriazole was used instead of the compound represented by Formula (2) in Example 1. Table 1 shows the evaluation results of the light transmittance of the obtained molded product at 420 nm.

Comparative Example 3

A mixed solution was prepared in the same manner as Example 1 except that 1.10 parts by weight of 2-(2-hydroxy-3-t-butyl-5-methylphenyl)-chlorobenzotriazole was used instead of the compound represented by Formula (2) in Example 1; however, an insoluble component was present and it was not possible to obtain a uniform liquid polymerizable composition.

Comparative Example 4

A molded product was produced in the same manner as Example 3 except that 0.45 parts by weight of 2-(2-hydroxy-3-t-butyl-5-methylphenyl)-chlorobenzotriazole was used instead of the compound represented by Formula (3) in Example 6. Table 1 shows the evaluation results of the light transmittance of the obtained molded product at 420 nm.

Comparative Example 5

A molded product was produced in the same manner as Example 4 except that 1.50 parts by weight of 2,2'-dihydroxy-4,4'-dimethoxybenzophenone was used instead of the compound represented by Formula (2) in Example 3. Table 1 shows the evaluation results of the light transmittance of the obtained molded product at 420 nm.

TABLE 1

| | | Example 1 | Example 2 | Example 3 | Example 4 | Example 5 | Example 6 | Comparative Example 1 | Comparative Example 2 | Comparative Example 3 | Comparative Example 4 | Comparative Example 5 |
|---|---|---|---|---|---|---|---|---|---|---|---|---|
| Component (parts by mass) | Compound represented by General Formula (2) | 0.05 | 0.05 | 0.05 | | | | | | | | |
| | Compound represented by General Formula (3) | | | | 0.10 | 0.10 | 0.10 | | | | | |
| | Ultraviolet absorber a1 | | | | | | | 0.05 | 1.00 | 1.10 | 0.45 | |
| | Ultraviolet absorber a2 | | | | | | | | | | | 1.50 |
| | NBDI | 49.6 | | | 49.6 | | | 49.6 | 49.6 | 49.6 | | |

TABLE 1-continued

|  |  | Example 1 | Example 2 | Example 3 | Example 4 | Example 5 | Example 6 | Comparative Example 1 | Comparative Example 2 | Comparative Example 3 | Comparative Example 4 | Comparative Example 5 |
|---|---|---|---|---|---|---|---|---|---|---|---|---|
|  | TDI |  | 35.2 |  |  | 35.2 |  |  |  |  |  |  |
|  | HDI |  | 18.3 |  |  | 18.3 |  |  |  |  |  |  |
|  | PEMP | 24.9 | 31.9 |  | 24.9 | 31.9 |  | 24.9 | 24.9 | 24.9 |  |  |
|  | GST | 25.5 |  |  | 25.5 |  |  | 25.5 | 25.5 | 25.5 |  |  |
|  | FSH |  |  |  |  |  | 7.3 |  |  |  | 7.3 |  |
|  | 2ME |  | 14.6 |  |  | 14.6 |  |  |  |  |  |  |
|  | ETDS |  |  |  |  |  | 92.7 |  |  |  | 92.7 |  |
|  | ADC |  |  | 100 |  |  |  |  |  |  |  | 100 |
| Evaluation results | Light transmission [% T] at a wavelength of 420 nm | 0.60 | 3.50 | 17.40 | 2.20 | 13.10 | 4.70 | 76.80 | 15.70 | — | 15.20 | 20.00 |

The compounds listed in Table 1 are as follows.
NBDI: a mixture of 2,5-bis(isocyanatomethyl)bicyclo-[2.2.1]-heptane and 2,6-bis(isocyanatomethyl)bicyclo-[2.2.1]-heptane
TDI: a mixture of 2,4-tolylene diisocyanate and 2,6-tolylene diisocyanate
HDI: hexamethylene diisocyanate
PEMP: pentaerythritol tetrakis(3-mercaptopropionate)
GST: 4-mercaptomethyl-1,8-dimercapto-3,6-dithiaoctane
FSH: a mixture with a main component of 5,7-dimercaptomethyl-1,11-dimercapto-3,6,9-trithiaundecane and 4,7-dimercaptomethyl-1,11-dimercapto-3,6,9-trithiaundecane, and 4,8-dimercaptomethyl-1,11-dimercapto-3,6,9-trithiaundecane
2ME: 2-mercaptoethanol
ETDS: bis(2,3-epithiopropyl)disulfide
ADC: diethylene glycol bisallyl carbonate
Ultraviolet absorber a1: 2-(2-hydroxy-3-t-butyl-5-methylphenyl)-chlorobenzotriazole
Ultraviolet absorber a2: 2,2'-dihydroxy-4,4'-dimethoxybenzophenone This application claims priority based on Japanese Patent Application No. 2017-144355 filed on Jul. 26, 2017, the entire disclosure of which is incorporated herein.

The invention claimed is:

1. A polymerizable composition for an optical material comprising:
a compound represented by General Formula (1); and
a polymerization reactive compound which is at least one compound selected from the group consisting of a polyiso(thio)cyanate compound, a poly(thio)epoxy compound, a polyoxetanyl compound, a polythietanyl compound, a polythiol compound, a polyamine compound, acid anhydrides, and a polycarboxylic acid compound,

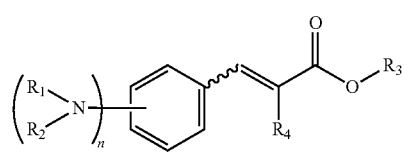

(1)

wherein, in General Formula (1), $R_1$ and $R_2$ each independently represent a hydrogen atom or a linear or branched alkyl group having 1 to 10 carbon atoms, $R_3$ represents a hydrogen atom or a linear or branched alkyl group having 1 to 20 carbon atoms, $R_4$ represents a hydrogen atom, a linear or branched alkyl group having 1 to 10 carbon atoms, or —C(O)OR$_5$, $R_5$ represents a hydrogen atom or a linear or branched alkyl group having 1 to 20 carbon atoms, and n represents an integer of 1 to 5.

2. The polymerizable composition for an optical material according to claim 1,
wherein the compound represented by General Formula (1) is a compound represented by Formula (2)

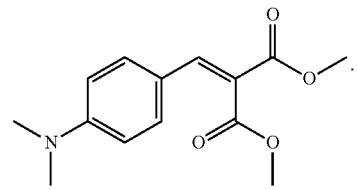

(2)

3. The polymerizable composition for an optical material according to claim 1,
wherein the compound represented by General Formula (1) is a compound represented by Formula (3)

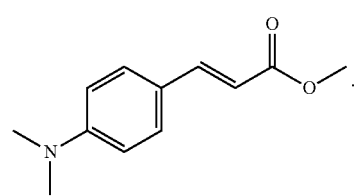

(3)

4. A molded product obtained by curing the polymerizable composition for an optical material according to claim 1.

5. A plastic lens comprising a resin base material, wherein the resin base material is the molded product according to claim 4.

6. A plastic lens comprising a laminate of a resin base material and a layer, wherein at least one of the resin base material and the layer is the molded product according to claim 4.

7. The plastic lens according to claim 6, wherein the resin base material is the molded product.

8. A process for producing an optical material, comprising:
cast polymerizing the polymerizable composition for an optical material according to claim 1.

* * * * *